United States Patent
Hong

(10) Patent No.: US 11,641,618 B2
(45) Date of Patent: May 2, 2023

(54) CELL ACCESS METHOD AND APPARATUS

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 353 days.

(21) Appl. No.: 17/040,126

(22) PCT Filed: Mar. 29, 2018

(86) PCT No.: PCT/CN2018/081095
§ 371 (c)(1),
(2) Date: Sep. 22, 2020

(87) PCT Pub. No.: WO2019/183884
PCT Pub. Date: Oct. 3, 2019

(65) Prior Publication Data
US 2021/0058855 A1    Feb. 25, 2021

(51) Int. Cl.
*H04W 48/16* (2009.01)
*H04W 4/42* (2018.01)
(Continued)

(52) U.S. Cl.
CPC ........ *H04W 48/16* (2013.01); *H04W 4/027* (2013.01); *H04W 4/42* (2018.02); *H04W 36/32* (2013.01); *H04W 48/10* (2013.01); *H04W 48/20* (2013.01)

(58) Field of Classification Search
CPC ....... H04W 36/32; H04W 4/027; H04W 4/42; H04W 48/10; H04W 48/16; H04W 48/20; H04W 48/04; G08G 1/0116; G08G 1/0125; G08G 1/0133; G08G 1/04; G08G 1/09
See application file for complete search history.

(56) References Cited

U.S. PATENT DOCUMENTS

| | | | |
|---|---|---|---|
| 11,343,756 B2* | 5/2022 | Hong | H04W 48/20 |
| 2008/0227447 A1* | 9/2008 | Jeong | H04W 36/0061 |
| | | | 455/67.11 |

(Continued)

FOREIGN PATENT DOCUMENTS

| | | |
|---|---|---|
| CN | 101583169 A | 11/2009 |
| CN | 102647766 A | 8/2012 |

(Continued)

OTHER PUBLICATIONS

Machine Translation of CN-107509224, merged with original docuement (Year: 2017).*

(Continued)

*Primary Examiner* — Rina C Pancholi
(74) *Attorney, Agent, or Firm* — Syncoda LLC; Feng Ma

(57) ABSTRACT

A cell access method includes determining a cell type of a first cell as a cell served by a high-speed-railway dedicated network or a cell of an ordinary Long-Term Evolution network. When determining the cell type as the cell served by the dedicated network, a first system message is configured and includes a first information unit indicating a number of equivalent cells, and sent to a terminal for determining, according to the first system message, that the cell type of the first cell is the cell served by the dedicated network. Upon determining a terminal movement state meeting preset access conditions of the cell served by the dedicated network, an access to the first cell is initiated. As such, the accuracy of terminal movement state can be predicted in accordance with the number of equivalent cells to the first cell, and the accuracy of cell access can be further improved.

18 Claims, 11 Drawing Sheets

(51) Int. Cl.
*H04W 4/02* (2018.01)
*H04W 36/32* (2009.01)
*H04W 48/10* (2009.01)
*H04W 48/20* (2009.01)

(56) References Cited

U.S. PATENT DOCUMENTS

| | | | |
|---|---|---|---|
| 2016/0255564 A1* | 9/2016 | Yang | H04W 36/32 455/436 |
| 2017/0201919 A1* | 7/2017 | Chong | H04W 36/0033 |
| 2017/0201925 A1* | 7/2017 | Chong | H04W 48/18 |
| 2020/0236605 A1* | 7/2020 | Yiu | H04W 36/32 |

FOREIGN PATENT DOCUMENTS

| | | | | |
|---|---|---|---|---|
| CN | 103841585 A | | 6/2014 | |
| CN | 106304172 A | | 1/2017 | |
| CN | 106332197 A | | 1/2017 | |
| CN | 107509224 A | * | 12/2017 | H04W 36/14 |
| CN | 107567046 A | | 1/2018 | |
| WO | 2015118510 A1 | | 8/2015 | |
| WO | WO-2019119343 A1 | * | 6/2019 | |

OTHER PUBLICATIONS

European Patent Office, Extended European Search Report Issued in Application No. 18912569.3, dated Dec. 18, 2020, Germany, 10 pages.

CMCC, MediaTek Inc., "Solutions for UE camping in high speed railway scenario",3GPP TSG RAN WG2 Meeting #100,Reno, Nevada, USA,R2-1713255, Revision of R2-1709000, Nov. 27-Dec. 1, 2017,4 pages.

Intel Corporation, CMCC,"Cell reselection for the UE on high-speed-dedicated network",3GPP TSG RAN WG2 Meeting #100,Reno, United State, R2-1712616, Nov. 30-Dec. 3, 2017, 4 pages.

CMCC,"Support of accurate UE mobility state estimation and mobility-state-based cell reselection for HSDN",3GPP TSG-RAN WG2 Meeting #101,Athens, Greece, R2-1803236, Feb. 26-Mar. 2, 2018, 14 pages.

ISA State Intellectual Property Office of the People's Republic of China, Written Opinion of the International Searching Authority Issued in Application No. PCT/CN2018/081095, dated Dec. 29, 2018, WIPO, 9 pages.

State Intellectual Property Office of the People's Republic of China, Office Action and Search Report Issued in Application No. 2018800003684, dated Apr. 1, 2021, 22 pages. (Submitted with Machine Translation).

ISA State Intellectual Property Office of the People's Republic of China, International Search Report Issued in Application No. PCT/CN2018/081095, dated Dec. 29, 2018, WIPO, 5 pages.

Zhang, Jiayi et al, "Review of Public Broadband Access Systems for High-speed Railways and Key Technologies", Journal of the China Railway Society, vol. 34, No. 1, Jan. 31, 2012, 8 pages.

* cited by examiner

CELL ACCESS METHOD AND APPARATUS

CROSS-REFERENCE TO RELATED APPLICATION

This application is a national stage of International Application No. PCT/CN2018/081095 filed on Mar. 29, 2018, the disclosure of which is hereby incorporated by reference in its entirety.

TECHNICAL FIELD

The present disclosure relates to the field of communication technologies, and in particular, to a cell access method and apparatus.

BACKGROUND

With the rapid development of high-speed-railway technology and the quick deployment and opening of high-speed trains, more and more users will choose the high-speed trains to travel. In order to satisfy the communication needs of mobile users on the high-speed trains and ensure the communication quality, operators choose to deploy a high-speed-railway dedicated network to try to specifically serve the mobile users on the high-speed trains. In the related art, depending on frequency resources for different regions, the high-speed-railway dedicated network and an ordinary public LTE (Long-Term Evolution) network may use the same frequencies or different frequencies. However, because the high-speed-railway dedicated network usually has better coverage, user equipment not on the high-speed trains are often connected to the high-speed-railway dedicated network, especially in urban regions with a large population, which is likely to cause congestion of the high-speed-railway dedicated network, affecting the communication quality of the mobile users on the high-speed trains.

SUMMARY

In order to overcome the problems existing in the related art, examples of the present disclosure provide a cell access method and apparatus.

According to a first aspect of the examples of the present disclosure, there is provided a cell access method. The method is applied to a base station, and includes:

determining a cell type of a first cell, wherein the cell type of the first cell includes a cell served by a high-speed-railway dedicated network or a cell of an ordinary public Long-Term Evolution LTE network;

in response to determining that the cell type of the first cell is the cell served by the high-speed-railway dedicated network, configuring a first system message, wherein the first system message includes a first information unit configured for indicating a number of equivalent cells to the first cell;

sending the first system message to a terminal, so that the terminal determines, according to the first system message, that the cell type of the first cell is the cell served by the high-speed-railway dedicated network and determines a terminal movement state, and in response to the terminal movement state meeting preset access conditions of the cell served by the high-speed-railway dedicated network, initiates an access to the first cell.

Optionally, the number of equivalent cells to the first cell indicated by the first information unit is greater than 1, and the number of equivalent cells greater than 1 indicates that the cell type of the first cell is the cell served by the high-speed-railway dedicated network.

Optionally, configuring the first system message includes:

adding, to the first system message, a specified bit configured for indicating the cell type of the first cell;

setting the specified bit as a first value, wherein the first value is configured for indicating that the cell type of the first cell is the cell served by the high-speed-railway dedicated network.

Optionally, the first information unit further includes a type determination rule configured for indicating different terminal movement speed types.

Optionally, configuring the first system message further includes:

adding a second information unit to the first system message, wherein the second information unit is configured for indicating a type determination rule for different terminal movement speed types.

Optionally, the first system message is specifically a system information block SIB1.

Optionally, the method further includes:

in response to determining that the cell type of the first cell is the cell of the ordinary public LTE network, configuring a second system message configured for indicating that the cell type of the first cell is the cell of the ordinary public LTE network;

sending the second system message to the terminal, so that the terminal determines, according to the second system message, that the cell type of the first cell is the cell of the ordinary public LTE network.

Optionally, configuring the second system message configured for indicating that the cell type of the first cell is the cell of the ordinary public LTE network includes:

adding, to the second system message, a third information unit configured for indicating the number of equivalent cells to the first cell, wherein the number of equivalent cells to the first cell is equal to 1, and the number of equivalent cells equal to 1 indicates that the cell type of the first cell is the cell of the ordinary public LTE network.

Optionally, configuring the second system message configured for indicating that the cell type of the first cell is the cell of the ordinary public LTE network includes:

adding a specified bit to the second system message, and setting the specified bit as a second value, wherein the second value is configured for indicating that the cell type of the first cell is the cell of the ordinary public LTE network.

Optionally, the second system message is specifically a system information block SIB1.

According to a second aspect of the examples of the present disclosure, there is provided a cell access method. The method is applied to a terminal, and includes:

receiving a first system message sent by a base station, wherein the first system message is configured by the base station after determining that a cell type of a first cell is a cell served by a high-speed-railway dedicated network, and the first system message includes a first information unit configured for indicating a number of equivalent cells to the first cell;

determining, according to the first system message, that the cell type of the first cell is the cell served by the high-speed-railway dedicated network and determining a terminal movement state, and in response to the terminal movement state meeting preset access conditions of the cell served by the high-speed-railway dedicated network, initiating an access to the first cell.

Optionally, the number of equivalent cells to the first cell indicated by the first information unit is greater than 1, and the number of equivalent cells greater than 1 indicates that the cell type of the first cell is the cell served by the high-speed-railway dedicated network;

determining, according to the first system message, that the cell type of the first cell is the cell served by the high-speed-railway dedicated network and determining the terminal movement state, and in response to the terminal movement state meeting the preset access conditions of the cell served by the high-speed-railway dedicated network, initiating the access to the first cell includes:

determining, according to the number of equivalent cells to the first cell being greater than 1, that the cell type of the first cell is the cell served by the high-speed-railway dedicated network;

calculating the terminal movement speed according to the number of equivalent cells to the first cell;

if the calculated terminal movement speed is within a specified movement speed range of the cell served by the high-speed-railway dedicated network, initiating the access to the first cell.

Optionally, the first system message further includes a specified bit configured for indicating the cell type of the first cell, and the specified bit is set as a first value, wherein the first value is configured for indicating that the cell type of the first cell is the cell served by the high-speed-railway dedicated network;

determining, according to the first system message, that the cell type of the first cell is the cell served by the high-speed-railway dedicated network and determining the terminal movement state, and in response to the terminal movement state meeting the preset access conditions of the cell served by the high-speed-railway dedicated network, initiating the access to the first cell includes:

determining, according to the specified bit being the first value, that the cell type of the first cell is the cell served by the high-speed-railway dedicated network;

calculating the terminal movement speed according to the number of equivalent cells to the first cell;

if the calculated terminal movement speed is within a specified movement speed range of the cell served by the high-speed-railway dedicated network, initiating the access to the first cell.

Optionally, the first information unit further includes a type determination rule configured for indicating different terminal movement speed types;

if the calculated terminal movement speed is within the specified movement speed range of the cell served by the high-speed-railway dedicated network, initiating the access to the first cell includes:

obtaining the type determination rule from the first information unit;

determining a terminal movement speed type corresponding to the terminal movement speed according to the type determination rule;

if the determined terminal movement speed type belongs to a specified movement speed type of the cell served by the high-speed-railway dedicated network, initiating the access to the first cell.

Optionally, the first system message further includes a second information unit configured for indicating a type determination rule for different terminal movement speed types;

if the calculated terminal movement speed is within the specified movement speed range of the cell served by the high-speed-railway dedicated network, initiating the access to the first cell includes:

obtaining the type determination rule from the second information unit;

determining a terminal movement speed type corresponding to the calculated terminal movement speed according to the type determination rule;

if the determined terminal movement speed type belongs to a specified movement speed type of the cell served by the high-speed-railway dedicated network, initiating the access to the first cell.

Optionally, the first system message is specifically a system information block SIB1.

Optionally, the method further includes:

receiving a second system message sent by the base station, wherein the second system message is configured for indicating that the cell type of the first cell is a cell of an ordinary public LTE network, and the second system message is configured by the base station after determining that the cell type of the first cell is the cell of the ordinary public LTE network;

determining, according to the second system message, that the cell type of the first cell is the cell of the ordinary public LTE network.

Optionally, the second system message includes a third information unit configured for indicating the number of equivalent cells to the first cell, and the number of equivalent cells is equal to 1;

determining, according to the second system message, that the cell type of the first cell is the cell of the ordinary public LTE network includes:

determining, according to the number of equivalent cells to the first cell indicated by the third information unit being equal to 1, that the cell type of the first cell is the cell of the ordinary public LTE network.

Optionally, the second system message includes a specified bit configured for indicating the cell type of the first cell, and the specified bit is set as a second value, wherein the second value is configured for indicating that the cell type of the first cell is the cell of the ordinary public LTE network;

determining, according to the second system message, that the cell type of the first cell is the cell of the ordinary public LTE network includes:

determining, according to the specified bit in the first system message being the second value, that the cell type of the first cell is the cell of the ordinary public LTE network.

Optionally, the second system message is specifically a system information block SIB1.

According to a third aspect of the examples of the present disclosure, there is provided a cell access apparatus. The apparatus is applied to a base station, and includes:

a cell type determining module configured to determine a cell type of a first cell, wherein the cell type of the first cell includes a cell served by a high-speed-railway dedicated network or a cell of an ordinary public Long-Term Evolution (LTE) network;

a first configuration module configured to, in response to determining that the cell type of the first cell is the cell served by the high-speed-railway dedicated network, configure a first system message, wherein the first system message includes a first information unit configured for indicating a number of equivalent cells to the first cell;

a first sending module configured to send the first system message to a terminal, so that the terminal determines, according to the first system message, that the cell type of the first cell is the cell served by the high-speed-railway dedicated network and determines a terminal movement state, and in response to the terminal movement state meeting preset access conditions of the cell served by the high-speed-railway dedicated network, initiates an access to the first cell.

Optionally, the number of equivalent cells to the first cell indicated by the first information unit is greater than 1, and the number of equivalent cells greater than 1 indicates that the cell type of the first cell is the cell served by the high-speed-railway dedicated network.

Optionally, the first configuration module includes:

a first addition submodule configured to add, to the first system message, a specified bit configured for indicating the cell type of the first cell;

a first setting submodule configured to set the specified bit as a first value, wherein the first value is configured for indicating that the cell type of the first cell is the cell served by the high-speed-railway dedicated network.

Optionally, the first information unit further includes a type determination rule configured for indicating different terminal movement speed types.

Optionally, the first configuration module further includes:

a second addition submodule configured to add a second information unit to the first system message, wherein the second information unit is configured for indicating a type determination rule for different terminal movement speed types.

Optionally, the first system message is specifically a system information block SIB1.

Optionally, the apparatus further includes:

a second configuration module configured to, in response to determining that the cell type of the first cell is the cell of the ordinary public LTE network, configure a second system message configured for indicating that the cell type of the first cell is the cell of the ordinary public LTE network;

a second sending module configured to send the second system message to the terminal, so that the terminal determines, according to the second system message, that the cell type of the first cell is the cell of the ordinary public LTE network.

Optionally, the second configuration module includes:

a third addition submodule configured to add, to the second system message, a third information unit configured for indicating the number of equivalent cells to the first cell, wherein the number of equivalent cells to the first cell is equal to 1, and the number of equivalent cells equal to 1 indicates that the cell type of the first cell is the cell of the ordinary public LTE network.

Optionally, the second configuration module includes:

a fourth addition submodule configured to add a specified bit to the second system message, and set the specified bit as a second value, wherein the second value is configured for indicating that the cell type of the first cell is the cell of the ordinary public LTE network.

Optionally, the second system message is specifically a system information block SIB1.

According to a fourth aspect of the examples of the present disclosure, there is provided a cell access apparatus. The apparatus is applied to a terminal, and includes:

a first receiving module configured to receive a first system message sent by a base station, wherein the first system message is configured by the base station after determining that a cell type of a first cell is a cell served by a high-speed-railway dedicated network, and the first system message includes a first information unit configured for indicating a number of equivalent cells to the first cell;

an access module configured to, determines, according to the first system message, that the cell type of the first cell is the cell served by the high-speed-railway dedicated network and determine a terminal movement state, and in response to the terminal movement state meeting preset access conditions of the cell served by the high-speed-railway dedicated network, initiate an access to the first cell.

Optionally, the number of equivalent cells to the first cell indicated by the first information unit is greater than 1, and the number of equivalent cells greater than 1 indicates that the cell type of the first cell is the cell served by the high-speed-railway dedicated network;

the access module includes:

a first determining submodule configured to determine, according to the number of equivalent cells to the first cell being greater than 1, that the cell type of the first cell is the cell served by the high-speed-railway dedicated network;

a first calculating submodule configured to calculate the terminal movement speed according to the number of equivalent cells to the first cell;

a first access submodule configured to, if the calculated terminal movement speed is within a specified movement speed range of the cell served by the high-speed-railway dedicated network, initiate the access to the first cell.

Optionally, the first system message further includes a specified bit configured for indicating the cell type of the first cell, and the specified bit is set as a first value, wherein the first value is configured for indicating that the cell type of the first cell is the cell served by the high-speed-railway dedicated network;

the access module includes:

a second determining submodule configured to determine, according to the specified bit being the first value, that the cell type of the first cell is the cell served by the high-speed-railway dedicated network;

a second calculating submodule configured to calculate the terminal movement speed according to the number of equivalent cells to the first cell;

a second access submodule configured to, if the calculated terminal movement speed is within a specified movement speed range of the cell served by the high-speed-railway dedicated network, initiate the access to the first cell.

Optionally, the first information unit further includes a type determination rule configured for indicating different terminal movement speed types;

the first access submodule or the second access submodule includes:

a first obtaining submodule configured to obtain the type determination rule from the first information unit;

a third determining submodule configured to determine a terminal movement speed type corresponding to the terminal movement speed according to the type determination rule;

a third access submodule configured to, if the determined terminal movement speed type belongs to a specified movement speed type of the cell served by the high-speed-railway dedicated network, initiate the access to the first cell.

Optionally, the first system message further includes a second information unit configured for indicating a type determination rule for different terminal movement speed types;

the first access submodule or the second access submodule includes:

a second obtaining submodule configured to obtain the type determination rule from the second information unit;

a fourth determining submodule configured to determine a terminal movement speed type corresponding to the terminal movement speed according to the type determination rule;

a fourth access submodule configured to, if the determined terminal movement speed type belongs to a specified movement speed type of the cell served by the high-speed-railway dedicated network, initiate the access to the first cell.

Optionally, the first system message is specifically a system information block SIB1.

Optionally, the apparatus further includes:

a second receiving module configured to receive a second system message sent by the base station, wherein the second system message is configured for indicating that the cell type of the first cell is a cell of an ordinary public LTE network, and the first system message is configured by the base station after determining that the cell type of the first cell is the cell of the ordinary public LTE network;

an ordinary cell determining module configured to determine, according to the second system message, that the cell type of the first cell is the cell of the ordinary public LTE network.

Optionally, the second system message includes a third information unit configured for indicating the number of equivalent cells to the first cell, and the number of equivalent cells is equal to 1;

the ordinary cell determining module includes:

a fifth determining submodule configured to determine, according to the number of equivalent cells to the first cell indicated by the third information unit being equal to 1, that the cell type of the first cell is the cell of the ordinary public LTE network.

Optionally, the second system message includes a specified bit configured for indicating the cell type of the first cell, and the specified bit is set as a second value, wherein the second value is configured for indicating that the cell type of the first cell is the cell of the ordinary public LTE network;

the ordinary cell determining module includes:

a sixth determining submodule configured to determine, according to the specified bit in the first system message being the second value, that the cell type of the first cell is the cell of the ordinary public LTE network.

Optionally, the second system message is specifically an SIB1.

According to a fifth aspect of the examples of the present disclosure, there is provided a non-transitory computer readable storage medium having a computer program stored thereon, wherein the computer program is configured for executing a cell access method according to the first aspect.

According to a sixth aspect of the examples of the present disclosure, there is provided a non-transitory computer readable storage medium having a computer program stored thereon, wherein the computer program is configured for executing a cell access method according to the second aspect.

According to a seventh aspect of the examples of the present disclosure, there is provided a cell access apparatus. The apparatus is applied to a base station, and includes:

a processor;

memory for storing processor executable instructions;

wherein the processor is configured to:

determine a cell type of a first cell, wherein the cell type of the first cell includes a cell served by a high-speed-railway dedicated network or a cell of an ordinary public LTE network;

in response to determining that the cell type of the first cell is the cell served by the high-speed-railway dedicated network, configure a first system message, wherein the first system message includes a first information unit configured for indicating a number of equivalent cells to the first cell;

send the first system message to a terminal, so that the terminal determines, according to the first system message, that the cell type of the first cell is the cell served by the high-speed-railway dedicated network and determines a terminal movement state, and in response to the terminal movement state meeting preset access conditions of the cell served by the high-speed-railway dedicated network, initiates an access to the first cell.

According to an eighth aspect of the examples of the present disclosure, there is provided a cell access apparatus. The apparatus is applied to a terminal, and includes:

a processor;

memory for storing processor executable instructions;

wherein the processor is configured to:

receive a first system message sent by a base station, wherein the first system message is configured by the base station after determining that a cell type of a first cell is a cell served by a high-speed-railway dedicated network, and the first system message includes a first information unit configured for indicating a number of equivalent cells to the first cell;

determine, according to the first system message, that the cell type of the first cell is the cell served by the high-speed-railway dedicated network and determine a terminal movement state, and in response to the terminal movement state meeting preset access conditions of the cell served by the high-speed-railway dedicated network, initiate an access to the first cell.

The technical solutions provided by the examples of the present disclosure may include the following beneficial effects.

The base station in the present disclosure, after determining the cell type of the first cell to be the cell served by the high-speed-railway dedicated network, may set the first system message, where the first system message includes the first information unit configured for indicating the number of equivalent cells to the first cell. The base station sends the first system message to the terminal, so that the terminal may, determines, according to the first system message, that the cell type of the first cell is the cell served by the high-speed-railway dedicated network and determine the terminal movement state, and in response to the terminal movement state meeting the preset access conditions of the cell served by the high-speed-railway dedicated network, initiates the access to the first cell. Therefore, the accuracy of predicting the terminal movement state in accordance with the number of equivalent cells to the first cell is increased, and the accuracy of accessing the cell is further improved.

The terminal in the present disclosure may receive the first system message sent by the base station, where the first system message is the system message configured by the base station after determining that the cell type of the first cell is the cell served by the high-speed-railway dedicated network, and the first system message includes the first information unit configured for indicating the number of equivalent cells to the first cell. The terminal may determine, according to the first system message, that the cell type of the first cell is the cell served by the high-speed-railway dedicated network and determine the terminal movement state, and in response to the terminal movement state meeting the preset access conditions of the cell served by the high-speed-railway dedicated network, initiates the access to the first cell. Therefore, the accuracy of predicting the terminal movement state in accordance with the number of equivalent cells to the first cell is increased, and the accuracy of accessing the cell is further improved.

It should be understood that the above general description and the following detailed description are only exemplary and explanatory and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Figure 1:
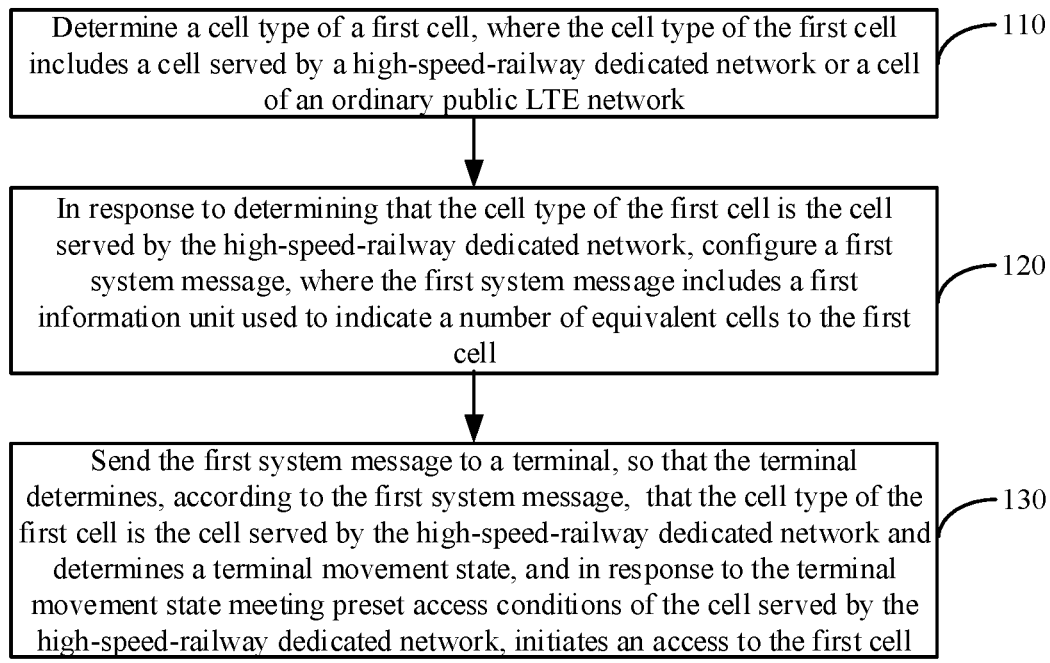
FIG. 1 is a flowchart illustrating a cell access method according to an example.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although terms "first," "second," "third," and the like may be used in the present disclosure to describe various information, such information should not be limited to these terms. These terms are only used to distinguish one category of information from another. For example, without departing from the scope of the present disclosure, indication information may be referred as second information; and similarly, second information may also be referred as indication information. Depending on the context, the word "if" as used herein may be interpreted as "when" or "upon" or "in response to determining".

Figure 2:
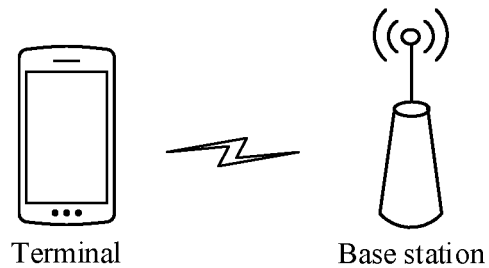
FIG. 2 is an application scenario diagram illustrating a cell access method according to an example.

FIG. 1 is a flowchart illustrating a cell access method according to an example. FIG. 2 is an application scenario diagram illustrating a cell access method according to an example. The cell access method may be adopted to manage a base station of a first cell. As shown in FIG. 1, the cell access method may include the following steps 110-130.

At step 110, a cell type of the first cell may be determined. The cell type of the first cell includes a cell served by a high-speed-railway dedicated network or a cell of an ordinary public LTE network.

In the examples of the present disclosure, one base station may manage one or more cells. The first cell is any of these cells managed by the base station.

At step 120, in response to that the cell type of the first cell is determined to be the cell served by the high-speed-railway dedicated network, a first system message is configured. The first system message includes a first information unit configured for indicating a number of equivalent cells to the first cell.

In the examples of the present disclosure, since a cell served by the high-speed-railway dedicated network is cascaded by a plurality of RRUs (Romote Radio Units), the number of equivalent cells may refer to a number of these RRUs. If the number of equivalent cells is greater than 1, it may indicate the cell served by the high-speed-railway dedicated network. If the number of equivalent cells is equal to 1, it may indicate the cell of the ordinary public LTE network.

Moreover, if the number of equivalent cells to the first cell is greater than 1, a terminal, in addition to knowing that the first cell is cascaded by several RRUs, may further use the number of equivalent cells to estimate its movement speed. For example, if a number of cell reselections or handovers performed by the terminal within a certain period of time exceeds a specified number, it may be determined that the terminal is in a high speed. If the number of equivalent cells to the first cell is 3, when the terminal reselects or hands over from the first cell to another cell, the number of reselections or handovers will be recorded as 3.

At step 130, the first system message is sent to a terminal, so that the terminal may, determines, according to the first system message, that the cell type of the first cell is the cell served by the high-speed-railway dedicated network and determine a terminal movement state, and in response to the terminal movement state meeting preset access conditions of the cell served by the high-speed-railway dedicated network, initiate an access to the first cell.

In an example scenario, as shown in FIG. 2, a terminal and a base station are included. The base station, in response to determining a cell type of a first cell being a cell served by a high-speed-railway dedicated network, first configures a first system message, where the first system message includes a first information unit configured for indicating a number of equivalent cells to the first cell. Then, the base station sends the first system message to the terminal. Thus, after receiving the first system message, the terminal may determine, according to the first system message, that the cell type of the first cell is the cell served by the high-speed-railway dedicated network and determine a terminal movement state, and in response to the terminal movement state meeting preset access conditions of the cell served by the high-speed-railway dedicated network, may initiate an access to the first cell.

As can be known from the above examples, after the cell type of the first cell is determined as the cell served by the high-speed-railway dedicated network, the first system message is configured, where the first system message includes the first information unit configured for indicating the number of equivalent cells to the first cell. The first system message is sent to the terminal, so that the terminal may determine, according to the first system message, that the cell type of the first cell is the cell served by the high-speed-railway dedicated network and determine the terminal movement state, and in response to the terminal movement state meeting the preset access conditions of the cell served by the high-speed-railway dedicated network, initiate the access to the first cell. Therefore, the accuracy of predicting the terminal movement state in accordance with the number of equivalent cells to the first cell is increased, and the accuracy of accessing the cell is further improved.

In an example, based on the method shown in FIG. 1, the number of equivalent cells to the first cell indicated by the first information unit is greater than 1, and the number of equivalent cells greater than 1 indicates that the cell type of the first cell is the cell served by the high-speed-railway dedicated network.

In this way, in addition to that the terminal can use the number of equivalent cells to estimate its movement speed, the base station may use the number of equivalent cells to indicate the cell type of the first cell. That is, if the number of equivalent cells is greater than 1, it may indicate the cell served by the high-speed-railway dedicated network. If the number of equivalent cells is equal to 1, it may indicate the cell of the ordinary public LTE network.

As can be known from the above examples, the number of equivalent cells greater than 1 may indicate the cell served by the high-speed-railway dedicated network, so that the terminal determines, according to a received number of equivalent cells, whether the first cell is the cell served by the high-speed-railway dedicated network, improving the efficiency of determining the cell type.

Figure 3:
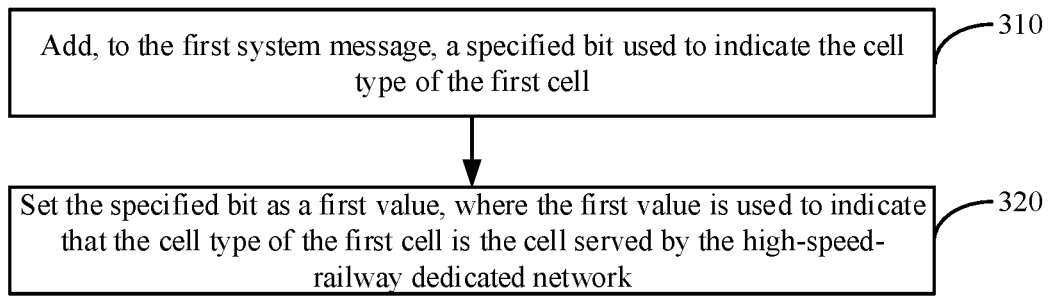
FIG. 3 is a flowchart illustrating another cell access method according to an example.

In an example, based on the method shown in FIG. 1, the base station may configure, in the first system message, a specified bit configured for indicating the cell type of the first cell. For example, the specified bit being 1 indicates the cell served by the high-speed-railway dedicated network, and the specified bit being 0 indicates the cell of the ordinary public LTE network. Thus, the terminal may learn the cell type of the first cell according to the specified bit. As shown in FIG. 3, the step 120 may also include, when performed, the following steps 310-330.

At step 310, a specified bit configured for indicating the cell type of the first cell is added to the first system message.

At step 320, the specified bit is set as a first value. The first value is configured for indicating that the cell type of the first cell is the cell served by the high-speed-railway dedicated network. The first value may be 0 or 1.

In this way, the first system message still includes the first information unit configured for indicating the number of equivalent cells to the first cell. At this time, the number of equivalent cells only indicates that the terminal can use the number of equivalent cells to estimate its movement speed.

As can be known from the above examples, the specified bit configured for indicating the cell type of the first cell may be configured, so that the terminal may determine, according to different values on the specified bit, whether the first cell is the cell served by the high-speed-railway dedicated network, improving the reliability of determining the cell type.

In an example, the base station, in addition to configuring the cell type of the first cell and the number of equivalent cells to the first cell, may configure a type determination rule for different terminal movement speed types. To be specific, the first information unit may further include a type determination rule configured for indicating different terminal movement speed types.

In this way, both of the number of equivalent cells to the first cell and the type determination rule for the different terminal movement speed types are located in the first information unit. That is, they are located in the same information unit.

As can be known from the above examples, the number of equivalent cells to the first cell and the type determination rule for the different terminal movement speed types may both be carried in the first information unit, so that the terminal estimates its terminal movement speed according to the number of equivalent cells to the first cell, and determines the speed type of the terminal movement speed according to the type determination rule for the different terminal movement speed types, further improving the accuracy of accessing the cell.

In an example, the base station, in addition to configuring the cell type of the first cell and the number of equivalent cells to the first cell, may configure the type determination rule for the different terminal movement speed types. To be specific, a second information unit is added to the first system message, and the second information unit is configured for indicating a type determination rule for different terminal movement speed types.

In this way, the number of equivalent cells to the first cell is included in the first information unit, and the type determination rule for the different terminal movement speed types is included in the second information unit. That is, they are included in different information units.

As can be known from the above examples, another information unit, that is, the second information unit, is configured for indicating the type determination rule for the different terminal movement speed types. Thus, the terminal may estimate its terminal movement speed according to the number of equivalent cells to the first cell indicated by the first information unit, and determine the speed type of the terminal movement speed according to the type determination rule for the different terminal movement speed types indicated by the second information unit, improving the reliability of indication sent by the base station.

In an example, based on the method shown in FIG. 1, the first system message may be specifically an SIB1 (System Information Block). The SIB1 is a system message 1 in the LTE network. The SIB1 mainly includes information related to accessing the cell by the terminal.

Figure 4:
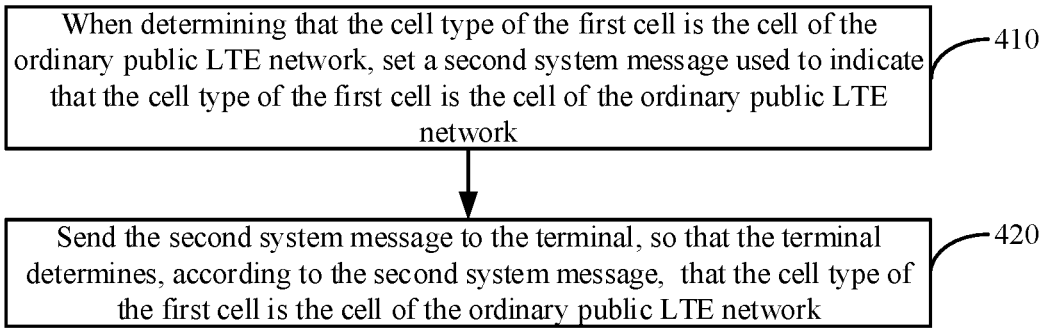
FIG. 4 is a flowchart illustrating another cell access method according to an example.

FIG. 4 is a flowchart illustrating another cell access method according to an example. The cell access method may be used to manage the base station of the first cell. Based on the method shown in FIG. 1, as shown in FIG. 4, in addition to the steps 110-130 in FIG. 1, the cell access method may further include the following steps 410-420.

At step 410, when it is determined that the cell type of the first cell is the cell of the ordinary public LTE network, a second system message configured for indicating that the cell type of the first cell is the cell of the ordinary public LTE network is configured.

At step 420, the second system message is sent to the terminal, so that the terminal may determine, according to the second system message, that the cell type of the first cell is the cell of the ordinary public LTE network.

As can be known from the above examples, when the cell type of the first cell is determined as the cell of the ordinary public LTE network, the second system message configured for indicating that the cell type of the first cell is the cell of the ordinary public LTE network may be configured, and the second system message is sent to the terminal, so that the terminal may determine, according to the second system message, that the cell type of the first cell is the cell of the ordinary public LTE network, improving the reliability of accessing the cell.

In an example, based on the method shown in FIG. 4, the base station may use the number of equivalent cells to indicate the cell type of the first cell. That is, if the number of equivalent cells is greater than 1, it may indicate the cell served by the high-speed-railway dedicated network. If the number of equivalent cells is equal to 1, it may indicate the cell of the ordinary public LTE network. To be specific, a third information unit configured for indicating the number of equivalent cells to the first cell is added to the second system message, and the number of equivalent cells to the first cell is equal to 1, where the number of equivalent cells equal to 1 indicates that the cell type of the first cell is the cell of the ordinary public LTE network.

As can be known from the above examples, the number of equivalent cells equal to 1 may indicate the cell of the ordinary public LTE network, so that the terminal may determine, according to a received number of equivalent cells, whether the first cell is the cell of the ordinary public LTE network, improving the efficiency of determining the cell type.

In an example, based on the method shown in FIG. 4, the base station may configure, in the third system message, a specified bit configured for indicating the cell type of the first cell. For example, the specified bit being 1 indicates the cell served by the high-speed-railway dedicated network, and the specified bit being 0 indicates the cell of the ordinary public LTE network, so that the terminal may learn the cell type of the first cell according to the specified bit. To be specific, a specified bit is added to the second system message, and the specified bit is set as a second value, where the second value is configured for indicating that the cell type of the first cell is the cell of the ordinary public LTE network.

As can be known from the above examples, the specified bit configured for indicating the cell type of the first cell may be set, so that the terminal may determine, according to different values on the specified bit, whether the first cell is the cell of the ordinary public LTE network, improving the reliability of determining the cell type.

In an example, based on the method shown in FIG. 4, the second system message may be specifically an SIB1. The SIB1 is a system message 1 in the LTE network. The SIB1 mainly includes information related to accessing the cell by the terminal.

Figure 5:
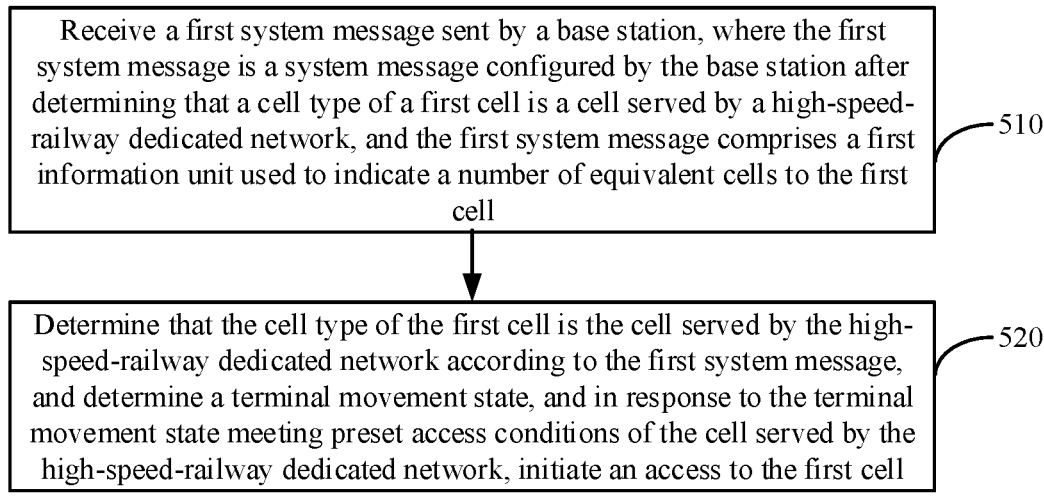
FIG. 5 is a flowchart illustrating a cell access method according to an example.

FIG. 5 is a flowchart illustrating a cell access method according to an example. The cell access method may be applied to a terminal. As shown in FIG. 5, the cell access method may include the following steps 510-520.

At step 510, a first system message sent by a base station is received. The first system message is a system message configured by the base station after determining that a cell type of a first cell is a cell served by a high-speed-railway dedicated network. The first system message includes a first information unit configured for indicating a number of equivalent cells to the first cell At step 520, according to the first system message, it is determined that the cell type of the first cell is the cell served by the high-speed-railway dedicated network and a terminal movement state is determined, and in response to that the terminal movement state meets preset access conditions of the cell served by the high-speed-railway dedicated network, an access is initiated to the first cell.

As can be known from the above examples, the first system message sent by the base station is received, where the first system message is the system message configured by the base station after determining that the cell type of the first cell is the cell served by the high-speed-railway dedicated network, and the first system message includes the first information unit configured for indicating the number of equivalent cells to the first cell. According to the first system message, it is determined that the cell type of the first cell is the cell served by the high-speed-railway dedicated network and the terminal movement state is determined, and in response to that the terminal movement state meets the preset access conditions of the cell served by the high-speed-railway dedicated network, the access is initiated to the first cell. Therefore, the accuracy of predicting the terminal movement state in accordance with the number of equivalent cells to the first cell is increased, and the accuracy of accessing the cell is further improved.

Figure 6:
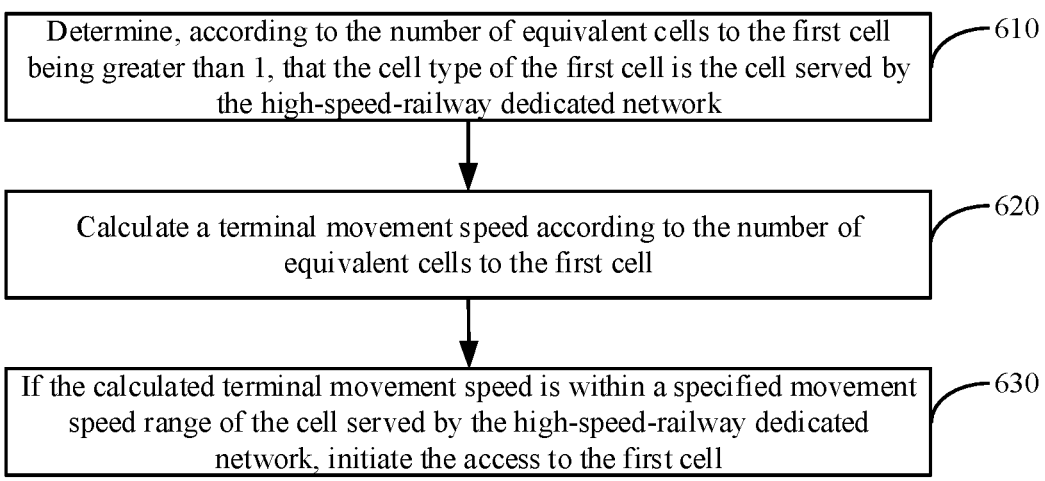
FIG. 6 is a flowchart illustrating another cell access method according to an example.

In an example, based on the method shown in FIG. 5, the number of equivalent cells to the first cell indicated by the first information unit is greater than 1, and the number of equivalent cells greater than 1 indicates that the cell type of the first cell is the cell served by the high-speed-railway dedicated network. As shown in FIG. 6, the step 520 may include, when performed, the following steps 610-630.

At step 610, according to the number of equivalent cells to the first cell being greater than 1, it is determined that the cell type of the first cell is the cell served by the high-speed-railway dedicated network.

At step 620, a terminal movement speed is calculated according to the number of equivalent cells to the first cell.

At step 630, if the calculated terminal movement speed is within a specified movement speed range of the cell served by the high-speed-railway dedicated network, the access is initiated to the first cell.

As can be known from the above examples, whether the first cell is the cell served by the high-speed-railway dedicated network may be determined according to a received number of equivalent cells, and the terminal movement speed may be calculated, improving the efficiency of determining the cell type.

Figure 7:
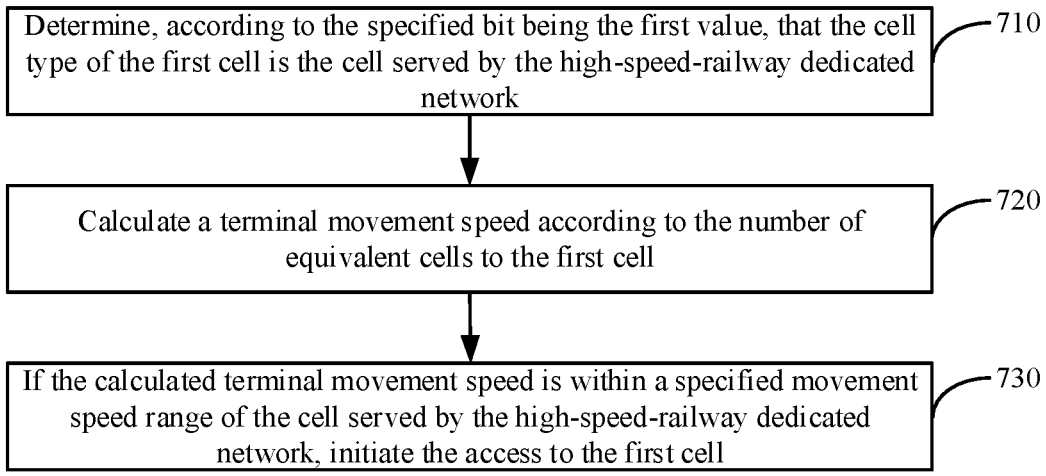
FIG. 7 is a flowchart illustrating another cell access method according to an example.

In an example, based on the method shown in FIG. 5, the first system message further includes a specified bit configured for indicating the cell type of the first cell, and the specified bit is set as a first value, where the first value is configured for indicating that the cell type of the first cell is the cell served by the high-speed-railway dedicated network. As shown in FIG. 7, the step 520 may include, when performed, the following steps 710-730.

At step 710, according to the specified bit being the first value, it is determined that the cell type of the first cell is the cell served by the high-speed-railway dedicated network.

In the examples of the present disclosure, the first value may be a value pre-agreed by the base station and the terminal and configured for indicating that the cell type of the first cell is the cell served by the high-speed-railway dedicated network, such as 0 or 1.

At step 720, a terminal movement speed is calculated according to the number of equivalent cells to the first cell.

At step 730, if the calculated terminal movement speed is within a specified movement speed range of the cell served by the high-speed-railway dedicated network, the access is initiated to the first cell.

In the examples of the present disclosure, the specified movement speed range of the cell served by the high-speed-railway dedicated network may be a preset range. For example, the specified movement speed range is that the number of cell reselections exceeds 8 times within 240 seconds.

As can be known from the above examples, whether a cell is the cell served by the high-speed-railway dedicated network may be determined according to different values on the specified bit, improving the reliability of determining the cell type.

In an example, based on the method shown in FIG. 5, the first system message may be specifically an SIB1. The SIB1 is a system message 1 in the LTE network. The SIB1 mainly includes information related to accessing the cell by the terminal.

Figure 8:
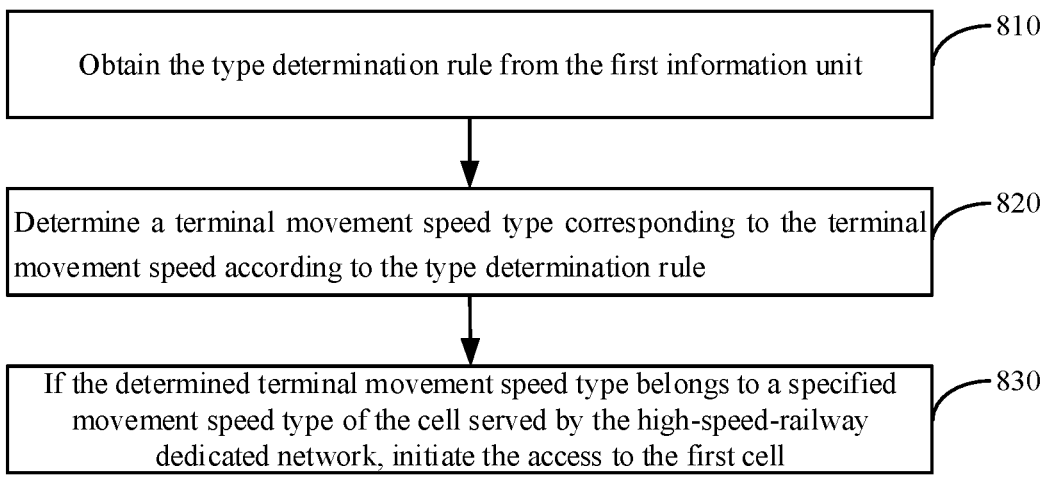
FIG. 8 is a flowchart illustrating another cell access method according to an example.

In an example, based on the method shown in FIG. 6 or FIG. 7, the first information unit further includes a type determination rule configured for indicating different terminal movement speed types. As shown in FIG. 8, the step 520 may include, when performed, the following steps 810-830.

At step 810, the type determination rule is obtained from the first information unit.

In the examples of the present disclosure, the type determination rule may include a determination rule of a low-speed type, a medium-speed type, a high-speed type or other speed type.

For example, the number of cell reselections exceeds 16 times within 240 seconds, which is a high-speed type; the number of cell reselections exceeds 8 times within 240 seconds, which is a medium-speed type; the number of cell reselections exceeds 1 time within 240 seconds, which is a low-speed type.

At step 820, a terminal movement speed type corresponding to the terminal movement speed is determined according to the type determination rule.

At step 830, if the determined terminal movement speed type belongs to a specified movement speed type of the cell served by the high-speed-railway dedicated network, the access is initiated to the first cell.

In the examples of the present disclosure, the specified movement speed type of the cell served by the high-speed-railway dedicated network may include a low-speed type and a high-speed type, or include a low-speed type, a medium-speed type and a high-speed type, or include a low-speed type, a medium-speed type, a high-speed type and an ultra-high-speed type, or the like.

As can be known from the above examples, the number of equivalent cells to the first cell and the type determination rule for the different terminal movement speed types may both be carried in the first information unit, so that the terminal estimates its terminal movement speed according to the number of equivalent cells to the first cell, and determines the speed type to which the terminal movement speed belongs according to the type determination rule for the different terminal movement speed types, further improving the accuracy of accessing the cell.

Figure 9:
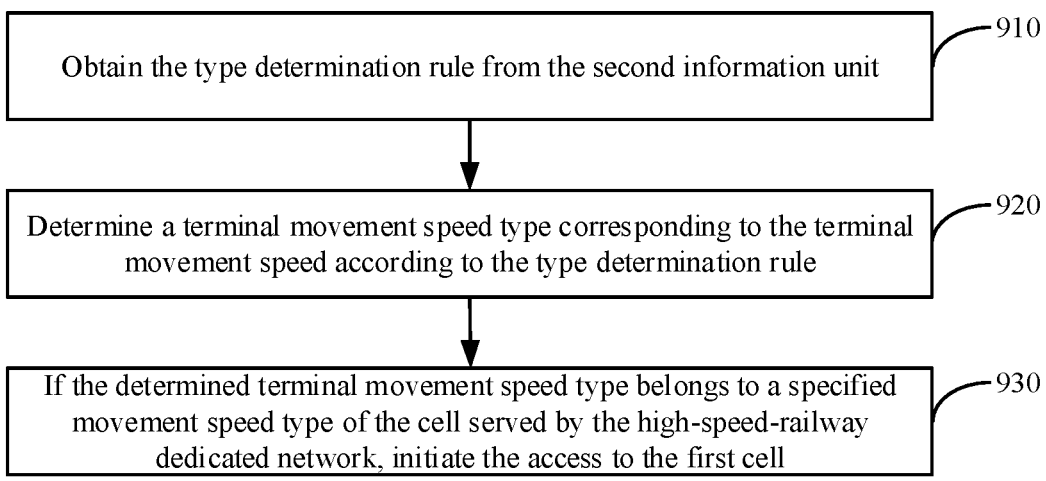
FIG. 9 is a flowchart illustrating another cell access method according to an example.

In an example, based on the method shown in FIG. 6 or FIG. 7, the first system message further includes a second information unit configured for indicating a type determination rule for different terminal movement speed types. As shown in FIG. 9, the step 520 may include, when performed, the following steps 910-930.

At step 910, the type determination rule is obtained from the second information unit.

At step 920, a terminal movement speed type corresponding to the terminal movement speed is determined according to the type determination rule.

At step 930, if the determined terminal movement speed type belongs to a specified movement speed type of the cell served by the high-speed-railway dedicated network, the access is initiated to the first cell.

In the examples of the present disclosure, the specified movement speed type of the cell served by the high-speed-railway dedicated network may include: a low-speed type and a high-speed type, or include a low-speed type, a medium-speed type and a high-speed type, or include a low-speed type, a medium-speed type, a high-speed type and an ultra high-speed type, or the like.

As can be known from the above examples, another information unit, that is, the second information unit, is configured for indicating the type determination rule for the different terminal movement speed types, so that the terminal estimates its terminal movement speed according to the number of equivalent cells to the first cell indicated by the first information unit, and determines the speed type to which the terminal movement speed belongs according to the type determination rule for the different terminal movement speed types indicated by the second information unit, improving the reliability of the indication sent by the base station.

Figure 10:
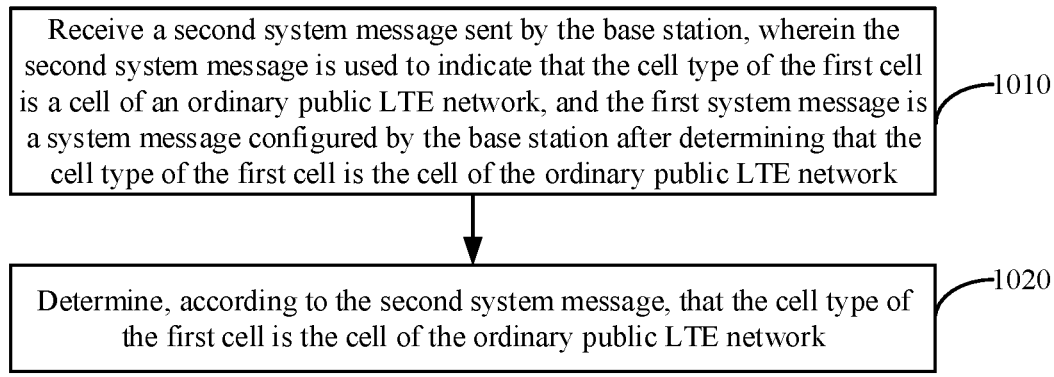
FIG. 10 is a flowchart illustrating another cell access method according to an example.

FIG. 10 is a flowchart illustrating another cell access method according to an example. The cell access method may be applied to a terminal. Based on the method shown in FIG. 5, as shown in FIG. 10, in addition to the steps 510-520 in FIG. 5, the cell access method may include the following steps 1010-1020.

At step 1010, a second system message sent by the base station is received. The second system message is configured for indicating that the cell type of the first cell is a cell of an ordinary public LTE network. The second system message is a system message configured by the base station after determining that the cell type of the first cell is the cell of the ordinary public LTE network At step 1020, it is determined according to the second system message that the cell type of the first cell is the cell of the ordinary public LTE network.

As can be known from the above examples, the second system message sent by the base station is received, where the second system message is configured for indicating that the cell type of the first cell is the cell of the ordinary public LTE network, and the second system message is the system message configured by the base station after determining that the cell type of the first cell is the cell of the ordinary public LTE network, and it is determined according to the second system message that the cell type of the first cell is the cell of the ordinary public LTE network, improving the reliability of accessing the cell.

In an example, based on the method shown in FIG. 10, the second system message includes a third information unit configured for indicating the number of equivalent cells to the first cell, and the number of equivalent cells is equal to 1. When the step 1020 is performed, it may be determined, according to the number of equivalent cells to the first cell indicated by the third information unit being equal to 1, that the cell type of the first cell is the cell of the ordinary public LTE network.

As can be known from the above examples, whether a cell is the cell of the ordinary public LTE network may be determined according to a received number of equivalent cells, improving the efficiency of determining the cell type.

In an example, based on the method shown in FIG. 10, the first system message includes a specified bit configured for indicating the cell type of the first cell, and the specified bit is set as a second value, where the second value is configured for indicating that the cell type of the first cell is the cell of the ordinary public LTE network. When the step 1020 is performed, according to the specified bit in the first system message being the second value, it may be determined that the cell type of the first cell is the cell of the ordinary public LTE network.

In the examples of the present disclosure, the second value may be a value pre-agreed by the base station and the terminal and configured for indicating that the cell type of the first cell is the cell of the ordinary public LTE network, which is different from the first value configured for indicating that the cell type of the first cell is the cell served by the high-speed-railway dedicated network. For example, the first value is 1, and the second value is 0.

As can be known from the above examples, whether a cell is the cell of the ordinary public LTE network may be determined according to different values on the specified bit, improving the reliability of determining the cell type.

In an example, based on the method shown in FIG. 10, the second system message may be specifically an SIB1. The SIB1 is a system message 1 in the LTE network. The SIB1 mainly includes information related to accessing the cell by the terminal.

Corresponding to the cell access method examples, the present disclosure further provides cell access apparatus examples.

Figure 11:
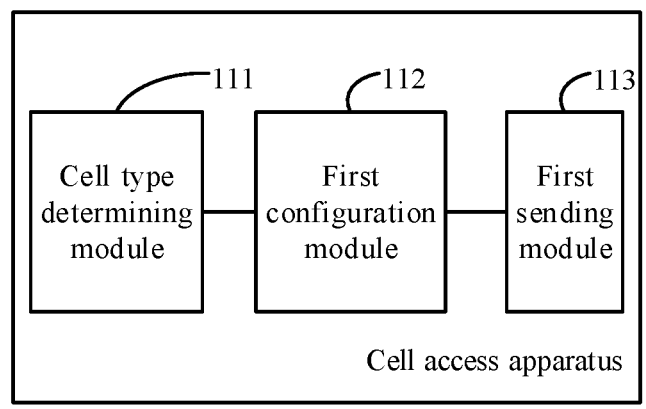
FIG. 11 is a block diagram illustrating a cell access apparatus according to an example.

FIG. 11 is a block diagram illustrating a cell access apparatus according to an example. The apparatus is used to manage a base station of a first cell and execute the cell access method shown in FIG. 1. As shown in FIG. 11, the cell access apparatus may include:

a cell type determining module 111 configured to determine a cell type of a first cell, wherein the cell type of the first cell includes a cell served by a high-speed-railway dedicated network or a cell of an ordinary public Long-Term Evolution LTE network;

a first configuration module 112 configured to, in response to determining that the cell type of the first cell is the cell served by the high-speed-railway dedicated network, configure a first system message, wherein the first system message includes a first information unit configured for indicating a number of equivalent cells to the first cell;

a first sending module 113 configured to send the first system message to a terminal, so that the terminal determines, according to the first system message, that the cell type of the first cell is the cell served by the high-speed-railway dedicated network and determine a terminal movement state, and in response to the terminal movement state meeting preset access conditions of the cell served by the high-speed-railway dedicated network, initiate an access to the first cell.

As can be known from the above examples, after the cell type of the first cell is determined and when it is determined that the cell type of the first cell is the cell served by the high-speed-railway dedicated network, the first system message is configured, where the first system message includes the first information unit configured for indicating the number of equivalent cells to the first cell. The first system message is sent to the terminal, so that the terminal may determine, according to the first system message, that the cell type of the first cell is the cell served by the high-speed-railway dedicated network and determine the terminal movement state, and in response to the terminal movement state meeting the preset access conditions of the cell served by the high-speed-railway dedicated network, initiates the access to the first cell. Therefore, the accuracy of predicting the terminal movement state in accordance with the number of equivalent cells to the first cell is increased, and the accuracy of accessing the cell is further improved.

In an example, based on the apparatus shown in FIG. 11, the number of equivalent cells to the first cell indicated by the first information unit is greater than 1, and the number of equivalent cells greater than 1 indicates that the cell type of the first cell is the cell served by the high-speed-railway dedicated network.

As can be known from the above examples, the number of equivalent cells greater than 1 may indicate the cell served by the high-speed-railway dedicated network, so that the terminal determines, according to a received number of equivalent cells, whether a cell is the cell served by the high-speed-railway dedicated network, improving the efficiency of determining the cell type.

Figure 12:
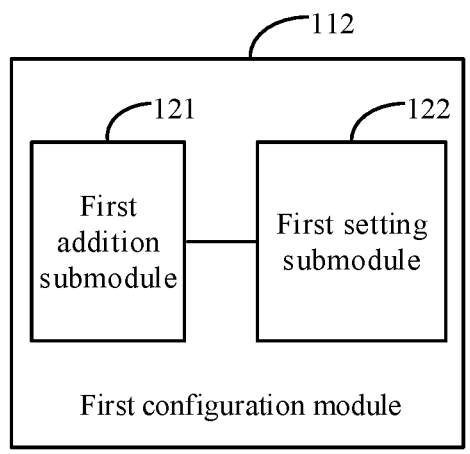
FIG. 12 is a block diagram illustrating another cell access apparatus according to an example.

In an example, based on the apparatus shown in FIG. 11, as shown in FIG. 12, the first configuration module 112 may include:

a first addition submodule 121 configured to add, to the first system message, a specified bit configured for indicating the cell type of the first cell;

a first setting submodule 122 configured to set the specified bit as a first value, wherein the first value is configured for indicating that the cell type of the first cell is the cell served by the high-speed-railway dedicated network.

As can be known from the above examples, the specified bit configured for indicating the cell type of the first cell may be set, so that the terminal may determine, according to different values on the specified bit, whether the first cell is the cell served by the high-speed-railway dedicated network, improving the reliability of determining the cell type.

In an example, based on the apparatus shown in FIG. 12, the first information unit further includes a type determination rule configured for indicating different terminal movement speed types.

As can be known from the above examples, the number of equivalent cells to the first cell and the type determination rule for the different terminal movement speed types may both be carried in the first information unit, so that the terminal estimates its terminal movement speed according to the number of equivalent cells to the first cell, and determines the speed type to which the terminal movement speed belongs according to the type determination rule for the different terminal movement speed types, further improving the accuracy of accessing the cell.

Figure 13:
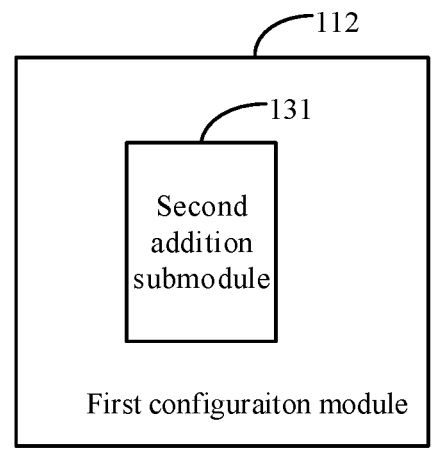
FIG. 13 is a block diagram illustrating another cell access apparatus according to an example.

In an example, based on the apparatus shown in FIG. 12, as shown in FIG. 13, the first configuration module 112 may further include:

a second addition submodule 131 configured to add a second information unit to the first system message, where the second information unit is configured for indicating a type determination rule for different terminal movement speed types.

As can be known from the above examples, another information unit, that is, the second information unit, is configured for indicating the type determination rule for the different terminal movement speed types, so that the terminal estimates its terminal movement speed according to the number of equivalent cells to the first cell indicated by the first information unit, and determines the speed type to which the terminal movement speed belongs according to the type determination rule for the different terminal movement speed types indicated by the second information unit, improving the reliability of the indication sent by the base station.

In an example, based on the apparatus shown in FIG. 11, the first system message is specifically an SIB1. The SIB1 is a system message 1 in the LTE network. The SIB1 mainly includes information related to accessing the cell by the terminal.

Figure 14:
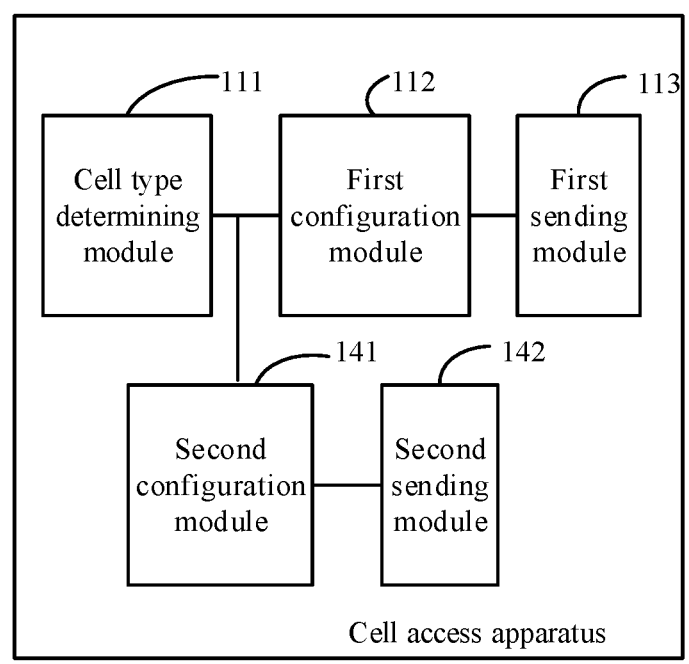
FIG. 14 is a block diagram illustrating another cell access apparatus according to an example.

In an example, based on the apparatus shown in FIG. 11, as shown in FIG. 14, the cell access apparatus may further include:

a second configuration module 141 configured to, in response to determining that the cell type of the first cell is the cell of the ordinary public LTE network, configure a second system message configured for indicating that the cell type of the first cell is the cell of the ordinary public LTE network;

a second sending module 142 configured to send the second system message to the terminal, so that the terminal determines, according to the second system message, that the cell type of the first cell is the cell of the ordinary public LTE network.

As can be known from the above examples, after the cell type of the first cell is determined and when it is determined that the cell type of the first cell is the cell of the ordinary public LTE network, the second system message configured for indicating that the cell type of the first cell is the cell of the ordinary public LTE network may be configured, and the second system message is sent to the terminal, so that the terminal determines, according to the second system message, that the cell type of the first cell is the cell of the ordinary public LTE network, improving the reliability of accessing the cell.

Figure 15:
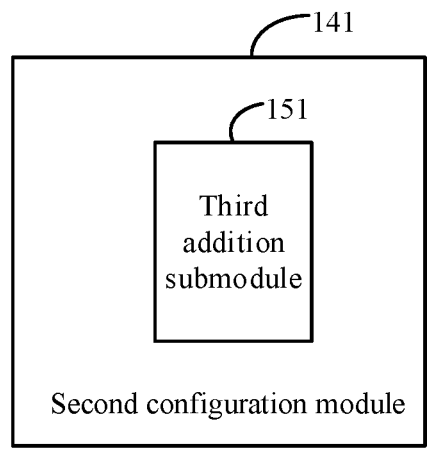
FIG. 15 is a block diagram illustrating another cell access apparatus according to an example.

In an example, based on the apparatus shown in FIG. 14, as shown in FIG. 15, the second configuration module 141 may include:

a third addition submodule 151 configured to add, to the second system message, a third information unit configured for indicating the number of equivalent cells to the first cell, wherein the number of equivalent cells to the first cell is equal to 1, and the number of equivalent cells equal to 1 indicates that the cell type of the first cell is the cell of the ordinary public LTE network.

As can be known from the above examples, the number of equivalent cells equal to 1 may indicate the cell of the ordinary public LTE network, so that the terminal determines, according to a received number of equivalent cells, whether a cell is the cell of the ordinary public LTE network, improving the efficiency of determining the cell type.

Figure 16:
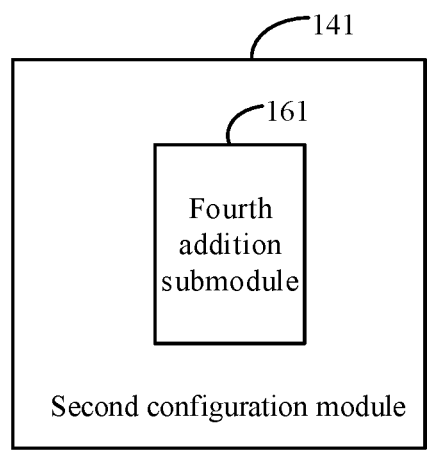
FIG. 16 is a block diagram illustrating another cell access apparatus according to an example.

In an example, based on the apparatus shown in FIG. 14, as shown in FIG. 16, the second configuration module 141 may include:

a fourth addition submodule 161 configured to add a specified bit to the second system message, and set the specified bit as a second value, wherein the second value is configured for indicating that the cell type of the first cell is the cell of the ordinary public LTE network.

As can be known from the above examples, the specified bit configured for indicating the cell type of the first cell may be set, so that the terminal may determine, according to different values on the specified bit, whether the first cell is the cell of the ordinary public LTE network, improving the reliability of determining the cell type.

In an example, based on the apparatus shown in FIG. 14, the second system message is specifically an SIB1. The SIB1 is a system message 1 in the LTE network. The SIB1 mainly includes information related to accessing the cell by the terminal.

Figure 17:
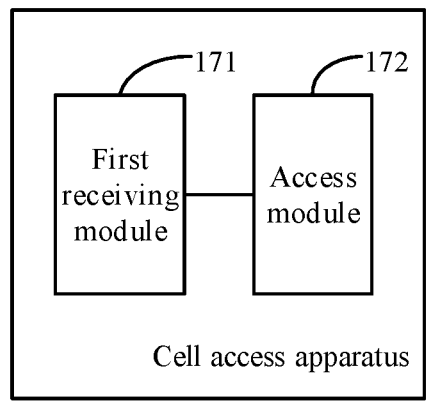
FIG. 17 is a block diagram illustrating a cell access apparatus according to an example.

FIG. 17 is a block diagram illustrating a cell access apparatus according to an example. The apparatus is applied to a terminal and configured for executing the cell access method shown in FIG. 5. As shown in FIG. 17, the cell access apparatus may include:

a first receiving module 171 configured to receive a first system message sent by a base station, where the first system message is configured by the base station after determining that a cell type of a first cell is a cell served by a high-speed-railway dedicated network, and the first system message includes a first information unit configured for indicating a number of equivalent cells to the first cell;

an access module 172 configured to, determines, according to the first system message, that the cell type of the first cell is the cell served by the high-speed-railway dedicated network and determine a terminal movement state, and in response to the terminal movement state meeting preset access conditions of the cell served by the high-speed-railway dedicated network, initiate an access to the first cell.

As can be known from the above examples, the first system message sent by the base station is received, where the first system message is the system message configured by the base station after determining that the cell type of the first cell is the cell served by the high-speed-railway dedicated network, and the first system message includes the first information unit configured for indicating the number of equivalent cells to the first cell. According to the first system message, it is determined that the cell type of the first cell is the cell served by the high-speed-railway dedicated network and the terminal movement state is determined, and in response to the terminal movement state meeting the preset access conditions of the cell served by the high-speed-railway dedicated network, the access is initiated to the first cell. Therefore, the accuracy of predicting the terminal movement state in accordance with the number of equivalent cells to the first cell is increased, and the accuracy of accessing the cell is further improved.

Figure 18:
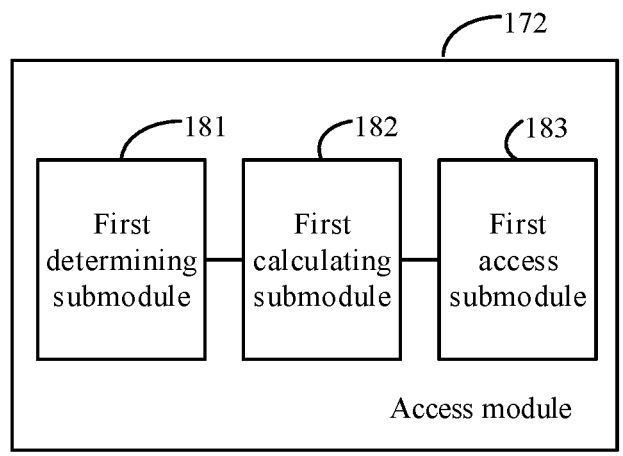
FIG. 18 is a block diagram illustrating another cell access apparatus according to an example.

In an example, based on the apparatus shown in FIG. 17, the number of equivalent cells to the first cell indicated by the first information unit is greater than 1, and the number of equivalent cells greater than 1 indicates that the cell type of the first cell is the cell served by the high-speed-railway dedicated network. As shown in FIG. 18, the access module 172 may include:

a first determining submodule 181 configured to determine, according to the number of equivalent cells to the first cell being greater than 1, that the cell type of the first cell is the cell served by the high-speed-railway dedicated network;

a first calculating submodule 182 configured to calculate the terminal movement speed according to the number of equivalent cells to the first cell;

a first access submodule 183 configured to, if the calculated terminal movement speed is within a specified movement speed range of the cell served by the high-speed-railway dedicated network, initiate the access to the first cell.

As can be known from the above examples, whether a cell is the cell served by the high-speed-railway dedicated network may be determined according to a received number of equivalent cells, and the terminal movement speed may be calculated, improving the efficiency of determining the cell type.

Figure 19:
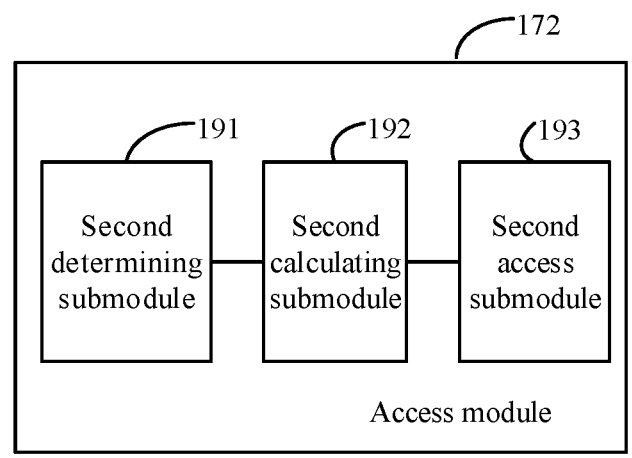
FIG. 19 is a block diagram illustrating another cell access apparatus according to an example.

In an example, based on the apparatus shown in FIG. 17, the first system message further includes a specified bit configured for indicating the cell type of the first cell, and the specified bit is set as a first value, where the first value is configured for indicating that the cell type of the first cell is the cell served by the high-speed-railway dedicated network. As shown in FIG. 19, the access module 172 may include:

a second determining submodule 191 configured to determine, according to the specified bit being the first value, that the cell type of the first cell is the cell served by the high-speed-railway dedicated network;

a second calculating submodule 192 configured to calculate the terminal movement speed according to the number of equivalent cells to the first cell;

a second access submodule 193 configured to, if the calculated terminal movement speed is within a specified movement speed range of the cell served by the high-speed-railway dedicated network, initiate the access to the first cell.

As can be known from the above examples, whether a cell is the cell served by the high-speed-railway dedicated network may be determined according to different values on the specified bit, improving the reliability of determining the cell type.

Figure 20:
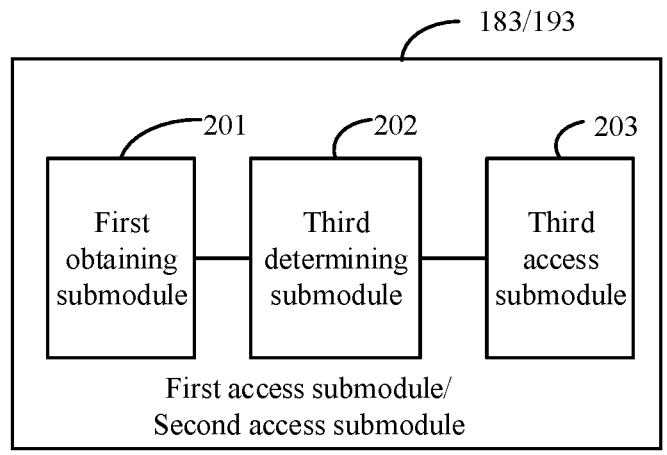
FIG. 20 is a block diagram illustrating another cell access apparatus according to an example.

In an example, based on the apparatus shown in FIG. 18 or FIG. 19, the first information unit further includes a type determination rule configured for indicating different terminal movement speed types. As shown in FIG. 20, the first access submodule 183 or the second access submodule 193 may include:

a first obtaining submodule 201 configured to obtain the type determination rule from the first information unit;

a third determining submodule 202 configured to determine a terminal movement speed type corresponding to the terminal movement speed according to the type determination rule;

a third access submodule 203 configured to, if the determined terminal movement speed type belongs to a specified movement speed type of the cell served by the high-speed-railway dedicated network, initiate the access to the first cell.

As can be known from the above examples, the number of equivalent cells to the first cell and the type determination rule for the different terminal movement speed types may both be carried in the first information unit, so that the speed type to which the terminal movement speed belongs may be determined according to the type determination rule for the different terminal movement speed types, further improving the accuracy of accessing the cell.

Figure 21:
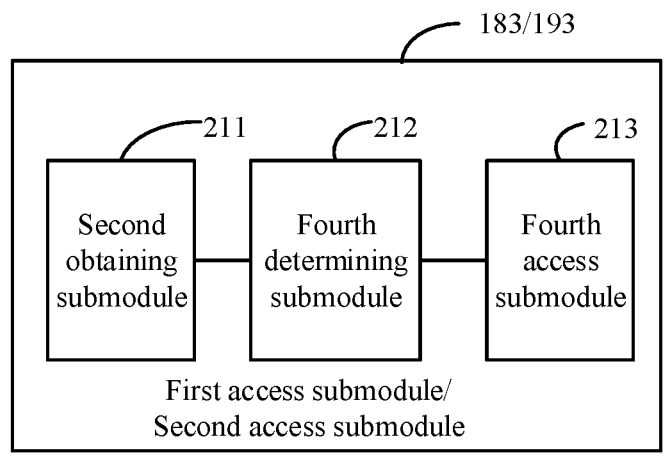
FIG. 21 is a block diagram illustrating another cell access apparatus according to an example.

In an example, based on the apparatus shown in FIG. 18 or FIG. 19, the first system message further includes a second information unit configured for indicating a type determination rule for different terminal movement speed types. As shown in FIG. 21, the first access submodule 183 or the second access submodule 193 may include:

a second obtaining submodule 211 configured to obtain the type determination rule from the second information unit;

a fourth determining submodule 212 configured to determine a terminal movement speed type corresponding to the terminal movement speed according to the type determination rule;

a fourth access submodule 213 configured to, if the determined terminal movement speed type belongs to a specified movement speed type of the cell served by the high-speed-railway dedicated network, initiate the access to the first cell.

As can be known from the above examples, another information unit, that is, the second information unit, is configured for indicating the type determination rule for the different terminal movement speed types, so that the speed type to which the terminal movement speed belongs may be determined according to the type determination rule for the different terminal movement speed types indicated by the second information unit, improving the reliability of the indication sent by the base station.

In an example, based on the apparatus shown in FIG. 17, the first system information is specifically an SIB1. The SIB1 is a system message 1 in the LTE network. The SIB1 mainly includes information related to accessing the cell by the terminal.

Figure 22:
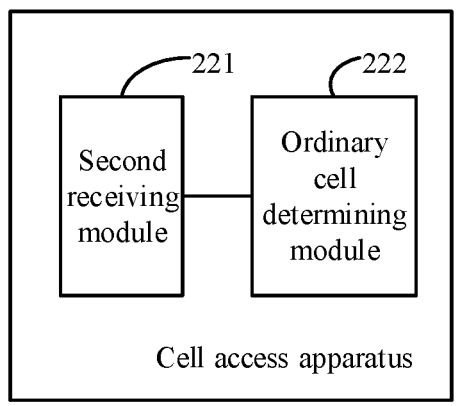
FIG. 22 is a block diagram illustrating another cell access apparatus according to an example.

In an example, based on the apparatus shown in FIG. 17, as shown in FIG. 22, the cell access apparatus may further include:

a second receiving module 221 configured to receive a second system message sent by the base station, wherein the second system message is configured for indicating that the cell type of the first cell is a cell of an ordinary public LTE network, and the first system message is configured by the base station after determining that the cell type of the first cell is the cell of the ordinary public LTE network;

an ordinary cell determining module 223 configured to determine, according to the second system message, that the cell type of the first cell is the cell of the ordinary public LTE network.

As can be known from the above examples, the second system message sent by the base station is received, where the second system message is configured for indicating that the cell type of the first cell is the cell of the ordinary public LTE network, and the second system message is the system message configured by the base station after determining that the cell type of the first cell is the cell of the ordinary public LTE network, and it is determined according to the second system message that the cell type of the first cell is the cell of the ordinary public LTE network, improving the reliability of accessing the cell.

Figure 23:
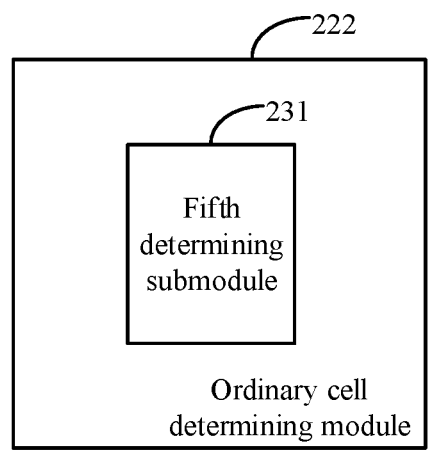
FIG. 23 is a block diagram illustrating another cell access apparatus according to an example.

In an example, based on the apparatus shown in FIG. 22, the second system message includes a third information unit configured for indicating the number of equivalent cells to the first cell, and the number of equivalent cells is equal to 1. As shown in FIG. 23, the ordinary cell determining module 223 may include:

a fifth determining submodule 231 configured to determine, according to the number of equivalent cells to the first cell indicated by the third information unit being equal to 1, that the cell type of the first cell is the cell of the ordinary public LTE network.

As can be known from the above examples, whether a cell is the cell of the ordinary public LTE network may be determined according to a received number of equivalent cells, improving the efficiency of determining the cell type.

Figure 24:
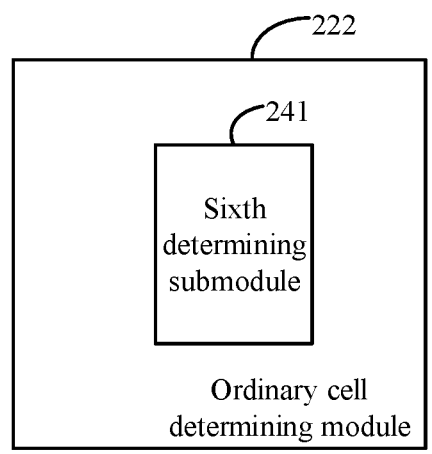
FIG. 24 is a block diagram illustrating another cell access apparatus according to an example.

In an example, based on the apparatus shown in FIG. 22, the second system message includes a specified bit configured for indicating the cell type of the first cell, and the specified bit is set as a second value, where the second value is configured for indicating that the cell type of the first cell is the cell of the ordinary public LTE network. As shown in FIG. 24, the ordinary cell determining module 223 may include:

a sixth determining submodule 241 configured to determine, according to the specified bit in the first system message being the second value, that the cell type of the first cell is the cell of the ordinary public LTE network.

As can be known from the above examples, whether a cell is the cell of the ordinary public LTE network may be determined according to different values on the specified bit, improving the reliability of determining the cell type.

In an example, based on the apparatus shown in FIG. 22, the second system message is specifically an SIB1. The SIB1 is a system message 1 in the LTE network. The SIB1 mainly includes information related to accessing the cell by the terminal.

For the apparatus examples, since they basically correspond to the method examples, reference may be made to the partial description of the method examples. The apparatus examples described above are merely illustrative, wherein the units described as separate components may or may not be physically separated, and the components displayed as units may or may not be physical units, i.e., may be located in one place or may be distributed to multiple network units. Some or all of the modules may be selected according to actual needs to achieve the objectives of the present disclosure. Those of ordinary skill in the art can understand and implement the present disclosure without any creative effort.

The present disclosure further provides a non-transitory computer readable storage medium having a computer program stored thereon, where the computer program is configured for executing a cell access method according to any of FIGS. 1-4.

The present disclosure further provides a non-transitory computer readable storage medium having a computer program stored thereon, where the computer program is configured for executing a cell access method according to any of FIGS. 5-10.

The present disclosure further provides a cell access apparatus. The apparatus is applied to a base station, and includes:

a processor;

a memory for storing processor executable instructions;

wherein the processor is configured to:

determine a cell type of a first cell, wherein the cell type of the first cell includes a cell served by a high-speed-railway dedicated network or a cell of an ordinary public Long-Term Evolution LTE network;

in response to determining that the cell type of the first cell is the cell served by the high-speed-railway dedicated network, configure a first system message, wherein the first system message includes a first information unit configured for indicating a number of equivalent cells to the first cell;

send the first system message to a terminal, so that the terminal determines, according to the first system message, that the cell type of the first cell is the cell served by the high-speed-railway dedicated network and determines a terminal movement state, and in response to the terminal movement state meeting preset access conditions of the cell served by the high-speed-railway dedicated network, initiate an access to the first cell.

Figure 25:
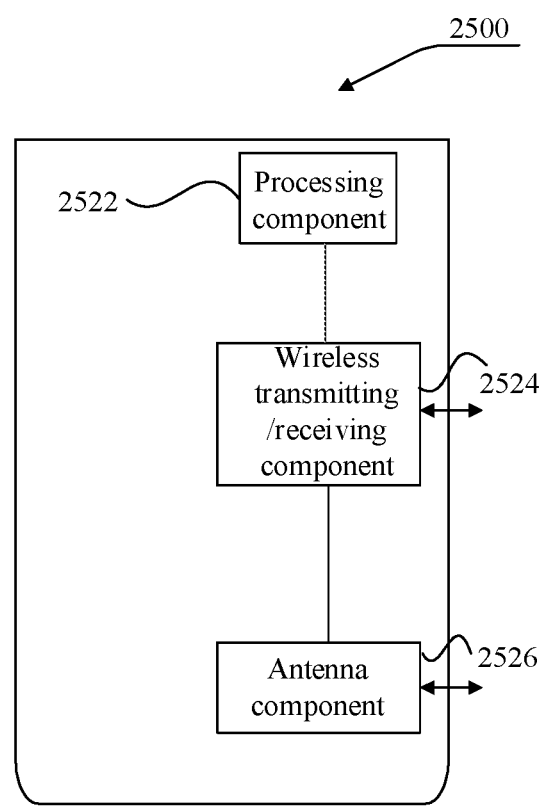
FIG. 25 is a schematic structural diagram illustrating a cell access apparatus according to an example.

FIG. 25 is a schematic structural diagram illustrating a cell access apparatus according to an example. The apparatus 2500 may be provided to a base station. Referring to FIG. 25, the apparatus 2500 includes a processing component 2522, a wireless transmitting/receiving component 2524, an antenna component 2526, and a signal processing portion specific to a wireless interface. The processing component 2522 may further include one or more processors.

One of the processors in the processing component 2522 may be configured to execute any of the above-described cell access methods.

The present disclosure further provides a cell access apparatus. The apparatus is applied to a terminal, and includes:

a processor;

a memory for storing processor executable instructions;

wherein the processor is configured to:

receive a first system message sent by a base station, wherein the first system message is configured by the base station after determining that a cell type of a first cell is a cell served by a high-speed-railway dedicated network, and the first system message includes a first information unit configured for indicating a number of equivalent cells to the first cell;

determine, according to the first system message, that the cell type of the first cell is the cell served by the high-speed-railway dedicated network and determine a terminal movement state, and in response to the terminal movement state meeting preset access conditions of the cell served by the high-speed-railway dedicated network, initiate an access to the first cell.

Figure 26:
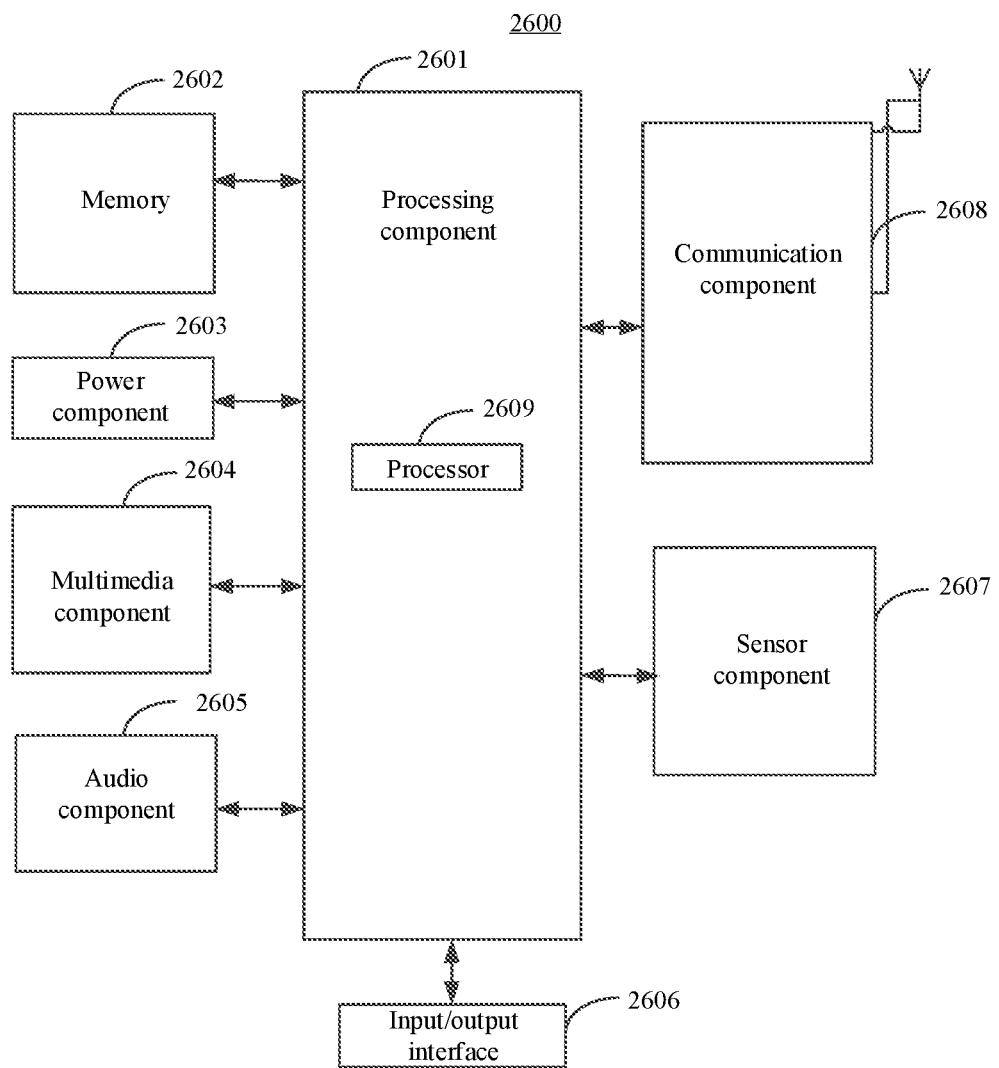
FIG. 26 is a schematic structural diagram illustrating a cell access apparatus according to an example.

FIG. 26 is a schematic structural diagram illustrating a cell access apparatus according to an example. As shown in FIG. 26, a cell access apparatus 2600 is shown according to an example. The apparatus 2600 may be a computer, a mobile phone, a digital broadcast terminal, a messaging device, a game console, a tablet device, a medical equipment, a fitness equipment, a personal digital assistant, or other terminals.

Referring to FIG. 26, the apparatus 2600 may include one or more of the following components: a processing component 2601, a memory 2602, a power component 2603, a multimedia component 2604, an audio component 2605, an input/output (I/O) interface 2606, a sensor component 2607, and a communication component 2608.

The processing component 2601 usually controls the overall operation of the apparatus 2600, such as operations associated with display, telephone calls, data communications, camera operations, and recording operations. The processing component 2601 may include one or more processors 2609 to execute instructions to perform all or part of the steps in the methods described above. Moreover, the processing component 2601 may include one or more modules to facilitate interaction between the processing component 2601 and other components. For example, the processing component 2601 may include a multimedia module to facilitate interaction between the multimedia component 2604 and the processing component 2601.

The memory 2602 is configured to store various types of data to support operation at the apparatus 2600. Examples of these data include instructions for any application or method operating at the apparatus 2600, contact data, phone book data, messages, pictures, videos, and the like. The memory 2602 may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 2603 provides power to various components of the apparatus 2600. The power component 2603 may include a power management system, one or more power sources, and other components associated with power generated, managed, and distributed for the apparatus 2600.

The multimedia component 2604 includes a screen that provides an output interface between the apparatus 2600 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 2604 includes a front camera and/or a rear camera. When the apparatus 2600 is in an operation mode, such as a shooting mode or a video mode, the front camera and/or the rear camera may receive external multimedia data. Each of the front and rear cameras may be a fixed optical lens system or have a focal length and an optical zoom capability.

The audio component 2605 is configured to output and/or input audio signals. For example, the audio component 2605 includes a microphone (MIC) configured to receive an external audio signal when the apparatus 2600 is in an operation mode, such as a call mode, a recording mode, and a voice recognition mode. The received audio signal may be further stored in the memory 2602 or transmitted via the communication component 2608. In some examples, the audio component 2605 also includes a loudspeaker for outputting an audio signal.

The I/O interface 2606 provides an interface between the processing component 2601 and a peripheral interface module which may be a keyboard, a click wheel, a button, or the like. These buttons may include, but are not limited to a home button, a volume button, a start button, and a lock button.

The sensor component 2607 includes one or more sensors for providing a status assessment in various aspects to the apparatus 2600. For example, the sensor component 2607 may detect an open/closed state of the apparatus 2600, and the relative positioning of components, for example, the component is a display and a keypad of the apparatus 2600. The sensor component 2607 may also detect a change in position of the apparatus 2600 or a component of the apparatus 2600, the presence or absence of a user in contact with the apparatus 2600, the orientation or acceleration/deceleration of the apparatus 2600 and a change in temperature of the apparatus 2600. The sensor component 2607 may include a proximity sensor configured to detect the presence of nearby objects without any physical contact. The sensor component 2607 may also include a light sensor, such as a CMOS or CCD image sensor, for use in imaging applications. In some examples, the sensor component 2607 may also include an acceleration sensor, a gyro sensor, a magnetic sensor, a pressure sensor, or a temperature sensor.

The communication component 2608 is configured to facilitate wired or wireless communication between the apparatus 2600 and other devices. The apparatus 2600 may access a wireless network based on a communication standard, such as WiFi, 2G or 3G, or a combination thereof. In an example, the communication component 2608 receives broadcast signals or broadcast associated information from an external broadcast management system via a broadcast channel. In an example, the communication component 2608 also includes a near field communication (NFC) module to facilitate short range communication. For example, the NFC module may be implemented based on a radio frequency identification (RFID) technology, an infrared data association (IrDA) technology, an ultra wide band (UWB) technology, a Bluetooth (BT) technology, and other technologies.

In an example, the apparatus 2600 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing the above methods.

In an example, there is also provided a non-transitory computer readable storage medium including instructions, such as a memory 2602 including instructions, where the instructions are executable by the processor 2609 of the apparatus 2600 to perform the method as described above. For example, the non-transitory computer readable storage medium may be a ROM, a random access memory (RAM), a CD-ROM, a magnetic tape, a floppy disk, and an optical data storage device.

When the instructions in the storage medium are executed by the processor, the apparatus 2600 is configured for executing any of the above-described cell access methods.

Other embodiments of the present disclosure will be readily apparent to those skilled in the art after considering the specification and practicing the contents disclosed herein. The present application is intended to cover any variations, uses, or adaptations of the present disclosure, which follow the general principle of the present disclosure and include common knowledge or conventional technical means in the art that are not disclosed in the present disclosure. The specification and examples are to be regarded as illustrative only. The true scope and spirit of the present disclosure are pointed out by the following claims.

It is to be understood that the present disclosure is not limited to the precise structures that have described and shown in the drawings, and various modifications and changes can be made without departing from the scope thereof. The scope of the disclosure is to be limited only by the appended claims.

What is claimed is:

1. A cell access method, applied to a base station, comprising:
   determining a cell type of a first cell, wherein the cell type of the first cell comprises a cell served by a high-speed-railway dedicated network or a cell of an ordinary public Long-Term Evolution (LTE) network;
   in response to determining that the cell type of the first cell is the cell served by the high-speed-railway dedicated network, configuring a first system message, wherein the first system message comprises a first information unit configured for indicating a number of equivalent cells to the first cell; and sending the first system message to a terminal to enable the terminal to determine, according to the first system message, that the cell type of the first cell is the cell served by the high-speed-railway dedicated network and determine a terminal movement state, and in response to the terminal movement state meeting preset access conditions of the cell served by the high-speed-railway dedicated network, initiate an access to the first cell; and in response to determining that the cell type of the first cell is the ceil of the ordinary public LTE network, configuring a second system message configured for indicating that the cell type of the first cell is the cell of the ordinary public LTE network, and sending the second system message to the terminal, to enable the terminal to determine, according to the second system message, that the cell type of the first cell is the cell of the ordinary public LTE network.

2. The method according to claim 1, wherein the number of equivalent cells to the first cell indicated by the first information unit is greater than 1, and the number of equivalent cells greater than 1 indicates that the cell type of the first cell is the cell served by the high-speed-railway dedicated network.

3. The method according to claim 2, wherein the first information unit further comprises a type determination rule configured for indicating different terminal movement speed types.

4. The method according to claim 2, wherein the configuring the first system message further comprises:

adding a second information unit to the first system message, wherein the second information unit is configured for indicating a type determination rule for different terminal movement speed types.

5. The method according to claim 1, wherein the configuring the first system message comprises:

adding, to the first system message, a specified bit configured for indicating the cell type of the first cell; and setting the specified bit as a first value, wherein the first value is configured for indicating that the cell type of the first cell is the cell served by the high-speed-railway dedicated network.

6. The method according to claim 1, wherein the first system message is a system information block SIB1.

7. The method according to claim 1, wherein the configuring the second system message configured for indicating that the cell type of the first cell is the cell of the ordinary public LTE network comprises:

adding, to the second system message, a third information unit configured for indicating the number of equivalent cells to the first cell, wherein the number of equivalent cells to the first cell is equal to 1, and the number of equivalent cells equal to 1 indicates that the cell type of the first cell is the cell of the ordinary public LTE network.

8. The method according to claim 1, wherein the configuring the second system message configured for indicating that the cell type of the first cell is the cell of the ordinary public LTE network comprises:

adding a specified bit to the second system message, and setting the specified bit as a second value, wherein the second value is configured for indicating that the cell type of the first cell is the cell of the ordinary public LTE network.

9. The method according to claim 1, wherein the second system message is a system information block SIB1.

10. A cell access method, applied to a terminal, comprising:

receiving a first system message sent by a base station, wherein the first system message is configured by the base station after determining that a cell type of a first cell is a cell served by a high-speed-railway dedicated network, and the first system message comprises a first information unit configured for indicating a number of equivalent cells to the first cell; and determining, according to the first system message, that the cell type of the first cell is the cell served by the high-speed-railway dedicated network and determining a terminal movement state, and in response to the terminal movement state meeting preset access conditions of the cell served by the high-speed-railway dedicated network, initiating an access to the first cell; and receiving a second system message sent by the base station, wherein the second system message is configured for indicating that the cell type of the first cell is a cell of an ordinary public Long-Term Evolution (LTE) network, and the second system message is configured by the base station after determining that the cell type of the first cell is the cell of the ordinary public LTE network; and determining, according to the second system message, that the cell type of the first cell is the cell of the ordinary public LTE network.

11. A terminal, comprising:

a processor;

memory for storing processor executable instructions;

wherein the processor is configured to implement the method of claim 10.

12. The method according to claim 11, wherein the number of equivalent cells to the first cell indicated by the first information unit is greater than 1, and the number of equivalent cells greater than 1 indicates that the cell type of the first cell is the cell served by the high-speed-railway dedicated network; and the determining, according to the first system message, that the cell type of the first cell is the cell served by the high-speed-railway dedicated network and determining the terminal movement state, and in response to the terminal movement state meeting the preset access conditions of the cell served by the high-speed-railway dedicated network, initiating the access to the first cell comprises:

determining, according to the number of equivalent cells to the first cell being greater than 1, that the cell type of the first cell is the cell served by the high-speed-railway dedicated network;

calculating the terminal movement speed according to the number of equivalent cells to the first cell; and responsive to that the calculated terminal movement speed is within a specified movement speed range of the cell served by the high-speed-railway dedicated network, initiating the access to the first cell.

13. The method according to claim 12, wherein the first information unit further comprises a type determination rule configured for indicating different terminal movement speed types; and responsive to that the calculated terminal movement speed is within the specified movement speed range of the cell served by the high-speed-railway dedicated network, initiating the access to the first cell comprises:

obtaining the type determination rule from the first information unit;

determining a terminal movement speed type corresponding to the terminal movement speed according to the type determination rule; and responsive to that the determined terminal movement speed type belongs to a specified movement speed type of the cell served by the high-speed-railway dedicated network, initiating the access to the first cell.

14. The method according to claim 12, wherein
the first system message further comprises a second information unit configured for indicating a type determination rule for different terminal movement speed types; and responsive to that the calculated terminal movement speed is within the specified movement speed range of the cell served by the high-speed-railway dedicated network, initiating the access to the first cell comprises:

obtaining the type determination rule from the second information unit;

determining a terminal movement speed type corresponding to the calculated terminal movement speed according to the type determination rule; and responsive to that the determined terminal movement speed type belongs to a specified movement speed type of the cell served by the high-speed-railway dedicated network, initiating the access to the first cell.

15. The method according to claim 11, wherein
the first system message further comprises a specified bit configured for indicating the cell type of the first cell, and the specified bit is set as a first value, wherein the first value is configured for indicating that the cell type of the first cell is the cell served by the high-speed-railway dedicated network; and the determining, according to the first system message, that the cell type of the first cell is the cell served by the high-speed-railway dedicated network and determining the terminal movement state, and in response to the terminal movement state meeting the preset access conditions of the cell served by the high-speed-railway dedicated network, initiating the access to the first cell comprises:

determining, according to the specified bit being the first value, that the cell type of the first cell is the cell served by the high-speed-railway dedicated network;

calculating the terminal movement speed according to the number of equivalent cells to the first cell; and responsive to that the calculated terminal movement speed is within a specified movement speed range of the cell served by the high-speed-railway dedicated network, initiating the access to the first cell.

16. The method according to claim 11, wherein
the second system message comprises a third information unit configured for indicating the number of equivalent cells to the first cell, and the number of equivalent cells is equal to 1; and the determining, according to the second system message, that the cell type of the first cell is the cell of the ordinary public LTE network comprises:

determining, according to the number of equivalent cells to the first cell indicated by the third information unit being equal to 1, that the cell type of the first cell is the cell of the ordinary public LTE network.

17. The method according to claim 11, wherein
the second system message comprises a specified bit configured for indicating the cell type of the first cell, and the specified bit is set as a second value, wherein the second value is configured for indicating that the cell type of the first cell is the cell of the ordinary public LTE network; and the determining, according to the second system message, that the cell type of the first cell is the cell of the ordinary public LTE network comprises:

determining, according to the specified bit in the first system message being the second value, that the cell type of the first cell is the cell of the ordinary public LTE network.

18. A cell access apparatus, applied to a base station, comprising:

a processor;

memory for storing processor executable instructions;

wherein the processor is configured to:

determine a cell type of a first cell, wherein the cell type of the first cell comprises a cell served by a high-speed-railway dedicated network or a cell of an ordinary public Long-Term Evolution (LTE) network;

in response to determining that the cell type of the first cell is the cell served by the high-speed-railway dedicated network, configure a first system message, wherein the first system message comprises a first information unit configured for indicating a number of equivalent cells to the first cell; and send the first system message to a terminal, to enable the terminal to determine, according to the first system message, that the cell type of the first cell is the cell served by the high-speed-railway dedicated network and enable a terminal movement state, and in response to the terminal movement state meeting preset access conditions of the cell served by the high-speed-railway dedicated network, initiate an access to the first cell; and in response to determining that the cell type of the first cell is the cell of the ordinary public LTE network, configure a second system message configured for indicating that the cell type of the first cell is the cell of the ordinary public LTE network, and send the second system message to the terminal, to enable the terminal to determine, according to the second system message, that the cell type of the first cell is the cell of the ordinary public LTE network.

* * * * *